United States Patent
Koyama

(10) Patent No.: US 8,730,416 B2
(45) Date of Patent: May 20, 2014

(54) LIQUID CRYSTAL DISPLAY DEVICE

(75) Inventor: Jun Koyama, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 216 days.

(21) Appl. No.: 13/308,601

(22) Filed: Dec. 1, 2011

(65) Prior Publication Data

US 2012/0154696 A1    Jun. 21, 2012

(30) Foreign Application Priority Data

Dec. 17, 2010   (JP) ................................ 2010-281177

(51) Int. Cl.
*G02F 1/1335*    (2006.01)

(52) U.S. Cl.
USPC .......................................................... 349/15

(58) Field of Classification Search
USPC .......................................................... 349/15
See application file for complete search history.

(56) References Cited

U.S. PATENT DOCUMENTS

| | | | |
|---|---|---|---|
| 5,247,194 A * | 9/1993 | Bae et al. ......................... | 257/59 |
| 5,302,987 A * | 4/1994 | Kanemori et al. ............. | 349/143 |
| 5,355,235 A * | 10/1994 | Nishizawa et al. ............. | 349/43 |
| 5,731,856 A | 3/1998 | Kim et al. | |
| 5,744,864 A | 4/1998 | Cillessen et al. | |
| 6,108,029 A * | 8/2000 | Lo ................................... | 348/43 |
| 6,294,274 B1 | 9/2001 | Kawazoe et al. | |
| 6,563,174 B2 | 5/2003 | Kawasaki et al. | |
| 6,597,348 B1 | 7/2003 | Yamazaki et al. | |
| 6,727,522 B1 | 4/2004 | Kawasaki et al. | |
| 6,882,012 B2 | 4/2005 | Yamazaki et al. | |
| 7,049,190 B2 | 5/2006 | Takeda et al. | |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Kamiya et al., "Carrier transport properties and electronic structures of amorphous oxide semiconductors: the present status," Solid State Physics, Sep. 1, 2009, vol. 44, No. 9, pp. 621-633, Agne Gijutsu Center.

(Continued)

*Primary Examiner* — James Dudek
(74) *Attorney, Agent, or Firm* — Eric J. Robinson; Robinson Intellectual Property Law Office, P.C.

(57) ABSTRACT

A liquid crystal display device includes a pixel area including a first display region and a second display region, a light supply portion sequentially supplying a plurality of lights having different hues to the first and second display regions and an optical system. Pairs of pixels are arranged in each of the first and second display regions. The pair of pixels is composed of a right-eye pixel and a left-eye pixel. The plurality of pieces of light is supplied to the first and second display regions to emit a first light with the right-eye pixel and a second light with the left-eye pixel. The optical system orients the travel direction of the first light to a right eye of a viewer and the travel direction of the second light to a left eye of the viewer.

16 Claims, 16 Drawing Sheets

(56) References Cited

U.S. PATENT DOCUMENTS

| | | | |
|---|---|---|---|
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,145,536 | B1 | 12/2006 | Yamazaki et al. |
| 7,193,593 | B2 | 3/2007 | Koyama et al. |
| 7,211,825 | B2 | 5/2007 | Shih et al. |
| 7,224,339 | B2 | 5/2007 | Koyama et al. |
| 7,268,756 | B2 | 9/2007 | Koyama et al. |
| 7,282,782 | B2 | 10/2007 | Hoffman et al. |
| 7,297,977 | B2 | 11/2007 | Hoffman et al. |
| 7,317,438 | B2 | 1/2008 | Yamazaki et al. |
| 7,323,356 | B2 | 1/2008 | Hosono et al. |
| 7,385,224 | B2 | 6/2008 | Ishii et al. |
| 7,385,579 | B2 | 6/2008 | Satake |
| 7,402,506 | B2 | 7/2008 | Levy et al. |
| 7,411,209 | B2 | 8/2008 | Endo et al. |
| 7,420,635 | B2 * | 9/2008 | Ozawa ........................ 349/114 |
| 7,425,937 | B2 | 9/2008 | Inukai |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,732,819 | B2 | 6/2010 | Akimoto et al. |
| 7,791,571 | B2 | 9/2010 | Ohtani et al. |
| 8,427,591 | B2 * | 4/2013 | Lo .................................. 349/15 |
| 2001/0046027 | A1 | 11/2001 | Tai et al. |
| 2002/0056838 | A1 | 5/2002 | Ogawa |
| 2002/0132454 | A1 | 9/2002 | Ohtsu et al. |
| 2003/0189401 | A1 | 10/2003 | Kido et al. |
| 2003/0218222 | A1 | 11/2003 | Wager et al. |
| 2004/0038446 | A1 | 2/2004 | Takeda et al. |
| 2004/0127038 | A1 | 7/2004 | Carcia et al. |
| 2005/0012097 | A1 | 1/2005 | Yamazaki |
| 2005/0017302 | A1 | 1/2005 | Hoffman |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |
| 2007/0272922 | A1 | 11/2007 | Kim et al. |
| 2007/0279359 | A1 | 12/2007 | Yoshida et al. |
| 2007/0279374 | A1 | 12/2007 | Kimura et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0296568 | A1 | 12/2008 | Ryu et al. |
| 2009/0068773 | A1 | 3/2009 | Lai et al. |
| 2009/0073325 | A1 | 3/2009 | Kuwabara et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0278122 | A1 | 11/2009 | Hosono et al. |
| 2009/0280600 | A1 | 11/2009 | Hosono et al. |
| 2009/0321737 | A1 | 12/2009 | Isa et al. |
| 2010/0065844 | A1 | 3/2010 | Tokunaga |
| 2010/0092800 | A1 | 4/2010 | Itagaki et al. |
| 2010/0109002 | A1 | 5/2010 | Itagaki et al. |
| 2010/0148177 | A1 | 6/2010 | Koyama et al. |
| 2010/0182282 | A1 | 7/2010 | Kurokawa et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-036145 | 2/1996 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2003-259395 | 9/2003 |
| JP | 2004-103957 A | 4/2004 |
| JP | 2004-273614 A | 9/2004 |
| JP | 2004-273732 A | 9/2004 |
| WO | WO-2004/114391 | 12/2004 |

OTHER PUBLICATIONS

Fortunato.E et al., "Wide-Bandgap High-Mobility ZNO Thin-Film Transistors Produced at Room Temperature,", Appl. Phys. Lett. (Applied Physics Letters), Sep. 27, 2004, vol. 85, No. 13, pp. 2541-2543.

Dembo.H et al., "RFCPUS on Glass and Plastic Substrates Fabricated by TFT Transfer Technology,", IEDM 05; Technology Digest of International Electron Devices Meeting, Dec. 15, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

(56) References Cited

OTHER PUBLICATIONS

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.
Hayashi.R et al., "42.1: Invited Paper: Improved Amorphous In—Ga—Zn—O TFTS,", SID DIGEST '08 : SID International Symposium Digest of Technical Papers, May 20, 2008, vol. 39, pp. 621-624.
Prins.M et al., "A Ferroelectric Transparent Thin-Film Transistor,", Appl. Phys. Lett. ( Applied Physics Letters) , Jun. 17, 1996, vol. 68, No. 25, pp. 3650-3652.
Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.
Kimizuka.N et al., "Syntheses and Single-Crystal Data of Homologous Compounds, In2O3(ZnO)m (m=3, 4, and 5), InGaO3(ZnO)3, and Ga2O3(ZnO)m (m =7, 8, 9, and 16) in the In2O3—ZnGa2O4—ZnO System,", Journal of Solid State Chemistry, Apr. 1, 1995, vol. 116, No. 1, pp. 170-178.
Nomura.K et al., "Thin-Film Transistor Fabricated in Single-Crystalline Transparent Oxide Semiconductor,", Science, May 23, 2003, vol. 300, No. 5623, pp. 1269-1272.
Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.
Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.
Osada.T et al, "15.2: Development of Driver-Integrated Panel using Amorphous In—Ga—Zn—-Oxide TFT,", SID Digest '09 : SID International Symposium Digest of Technical Papers, May 31, 2009, pp. 184-187.
Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.
Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.
Son.K et al., "42.4L: Late-News Paper: 4 Inch QVGA Amoled Driven by the Threshold Voltage Controlled Amorphous Gizo (Ga2O3—In2O3—ZnO) TFT,", SID Digest '08 : SID International Symposium Digest of Technical Papers, May 20, 2008, vol. 39, pp. 633-636.
Lee.J et al., "World's Largest (15-Inch) XGA AMLCD Panel Using Igzo Oxide TFT,", SID Digest '08 : SID International Symposium Digest of Technical Papers, May 20, 2008, vol. 39, pp. 625-628.
Nowatari.H et al., "60.2: Intermediate Connector With Suppressed Voltage Loss for White Tandem OLEDS,", SID Digest '09 : SID International Symposium Digest of Technical Papers, May 31, 2009, vol. 40, pp. 899-902.
Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.
Tsuda.K et al., "Ultra Low Power Consumption Technologies for Mobile TFT-LCDs ,", IDW '02 : Proceedings of the 9th International Display Workshops, Dec. 4, 2002, pp. 295-298.
Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.
Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.
Jeong.J et al., "3.1: Distinguished Paper: 12.1-Inch WXGA Amoled Display Driven by Indium—Gallium—Zinc Oxide TFTs Array,", SID Digest '08 : SID International Symposium Digest of Technical Papers, May 20, 2008, vol. 39, No. 1, pp. 1-4.
Park.J et al., "High performance amorphous oxide thin film transistors with self-aligned top-gate structure,", IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems,", Journal of Solid-State Circuits , 2008, vol. 43, No. 1, pp. 292-299.
Ohara.H et al., "Amorphous In—Ga—Zn—Oxide TFTs with Suppressed Variation for 4.0 inch QVGA Amoled Display,", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.
Cho.D et al., "21.2:AL and SN-Doped Zinc Indium Oxide Thin Film Transistors for Amoled Back-Plane,", SID Digest '09 : SID International Symposium Digest of Technical Papers, May 31, 2009, pp. 280-283.
Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.
Jin.D et al., "65.2:Distinguished Paper:World-Largest (6.5") Flexible Full Color Top Emission Amoled Display on Plastic Film and Its Bending Properties,", SID Digest '09 : SID International Symposium Digest of Technical Papers, May 31, 2009, pp. 983-985.
Sakata.J et al., "Development of 4.0-In. Amoled Display With Driver Circuit Using Amorphous IN—GA—ZN—Oxide TFTS,", IDW '09 Proceedings of the 16th International Display Workshops, 2009, pp. 689-692.
Park.J et al., "Amorphous Indium—Gallium—Zinc Oxide TFTS and Their Application for Large Size Amoled,", AM-FPD '08 Digest of Technical Papers, Jul. 2, 2008, pp. 275-278.
Park.S et al., "Challenge to Future Displays: Transparent AM-OLED Driven by Peald Grown ZNO TFT,", IMID '07 Digest, 2007, pp. 1249-1252.
Godo.H et al., "Temperature Dependence of Characteristics and Electronic Structure for Amorphous IN—GA—ZN—OXIDE TFT,", AM-FPD '09 Digest of Technical Papers, Jul. 1, 2009, pp. 41-44.
Osada.T et al., "Development of Driver-Integrated Panel Using Amorphous In—Ga—Zn—Oxide TFT,", AM-FPD '09 Digest of Technical Papers, Jul. 1, 2009, pp. 33-36.
Hirao.T et al., "Novel Top-Gate Zinc Oxide Thin-Film Transistors (ZNO TFTS) for AMLCDS,", Journal of the SID, 2007, vol. 15, No. 1, pp. 17-22.
Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.
Godo.H et al., "P-9:Numerical Analysis on Temperature Dependence of Characteristics of Amorphous IN—GA—ZN—OXIDE TFT,", SID Digest '09 : SID International Symposium Digest of Technical Papers, May 31, 2009, pp. 1110-1112.
Ohara.H et al., "21.3:4.0 In. QVGA Amoled Display Using In—Ga—Zn—Oxide TFTS With a Novel Passivation Layer,", SID Digest '09 : SID International Symposium Digest of Technical Papers, May 31, 2009, pp. 284-287.
Miyasaka.M, "Suftla Flexible Microelectronics on Their Way to Business,", SID Digest '07 : SID International Symposium Digest of Technical Papers, 2007, vol. 38, pp. 1673-1676.
Chern.H et al., "An Analytical Model for the Above-Threshold Characteristics of Polysilicon Thin-Film Transistors,", IEEE Transaction on Electron Devices, Jul. 1, 1995, vol. 42, No. 7, pp. 1240-1246.
Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.
Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

(56) References Cited

OTHER PUBLICATIONS

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N. et al., "Spinel,YBFE2O4, and YB2FE3O7 Types of Structures for Compounds in the In2O3 and SC2O3-A2O3-BO Systems [A; FE, GA, Or Al; B: MG, MN, FE, NI, CU, OR ZN] at Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys, Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. ( Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects inZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies In ZnO,", Appl. Phys. Lett. (Applied Physics Letters) , 2005, vol. 87, pp. 1221021-1-122102-3.

Oba.F et al., "Defect energetics in ZnO: A hybrid Hartee-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m <4):a Zn4s conductor,", Philosophical Magazine, 2001, vol. 81, No. 5, pp. 501-515.

Hosono,H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using Castep,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Apply. Phys. Lett. (Applied Physics Letters), Sep. 1, 2003, vol. 83, No. 9, pp. 1755-1757.

* cited by examiner

130

140

LIQUID CRYSTAL DISPLAY DEVICE

BACKGROUND OF THE INVENTION

1. Field of the Invention

One embodiment of the present invention relates to a liquid crystal display device displaying three-dimensional images.

2. Description of the Related Art

The market for 3D display devices are growing. Displaying a 3D image can be achieved by artificially creating, with a display device, difference between retinal images of both eyes (binocular parallax) which may occur when the viewer sees a stereoscopic object with both eyes. Three-dimensional (3D) display devices using such binocular parallax are going commercial with a variety of display methods which have been developed therefor. Among such display devices, small-sized display devices such as personal digital assistants or portable game consoles use mainly a direct-view-type display method using an optical system such as a parallax barrier, a lenticular lens, and a microlens array.

By the way, as in a two-dimensional liquid crystal display device, in a 3D liquid crystal display device, the power consumption of a light supply portion such as a backlight or a front light powerfully affects the power consumption of the whole liquid crystal display device. Particularly in a portable electronic appliance having difficulty receiving power constantly, such as a personal digital assistant or a portable game console, the light supply portion preferably has low power consumption because the lower the power consumption of the light supply portion, the longer the continuous operating time. An effective way of reducing the power consumption of the light supply portion is a field-sequential method (an FS method). The FS method is a driving method for displaying a color image by sequentially lighting a plurality of light sources having different hues. The FS method does not require the use of a color filter, reducing the loss of the light inside a panel. This can increase the use efficiency of the light from the light supply portion and reduce the power consumption of the whole liquid crystal display device. With the FS method, one pixel can display images corresponding to given colors, so that a high-definition image can be achieved.

Patent Document 1 discloses a technique to display a 3D image by a parallax barrier with which a right-eye image enters the right eye and a left-eye image enters the left eye. Patent Document 2 discloses a liquid crystal display device using the FS method, which is capable of displaying 3D images.

[Reference]
[Patent Document]
[Patent Document 1] Japanese Published Patent Application No. H8-036145
[Patent Document 2] Japanese Published Patent Application No. 2003-259395

SUMMARY OF THE INVENTION

However, the FS method is likely to cause a phenomenon called color breakup in which images corresponding to given colors are uncombined and separately recognized. Color breakup is apparent particularly when moving images are displayed.

In a 3D display method using an optical system such as a parallax barrier, a lenticular lens, and a microlens array, the light from a right-eye pixel enters the right eye and the light from a left-eye pixel enters the left eye. Consequently, the number of pixels in each row which contribute to image display is reduced to half of the actual number, which prevents high-definition images from being displayed.

In view of the above problem, an object of one embodiment of the present invention is to provide a liquid crystal display device that has low power consumption, causes no color breakup, and is capable of displaying a high-definition color 3D image.

To solve the above problem, one embodiment of the present invention includes a pixel area including a first display region and a second display region, a light supply portion sequentially supplying a plurality of pieces of light of different hues to the first and second display regions, and an optical system. Two pieces of light supplied to the first and second display regions in parallel have different hues. The two pieces of light is part of the plurality of pieces of light. A plurality of pairs of pixels is arranged in each of the first and second display regions. The pair of pixels is composed of a right-eye pixel and a left-eye pixel. The plurality of pieces of light is supplied to the first and second display regions to obtain a first light with the right-eye pixel and a second light with the left-eye pixel. In other words, the first light has right-eye image data and the second light has left-eye image data.

The optical system makes travel direction of the first light differ from travel direction of the second light. Specifically, the optical system orients travel direction of the first light to a right eye of a viewer and travel direction of the second light to a left eye of the viewer. Note that the optical system is an optical element controlling the travel direction of light, such as a parallax barrier, a lenticular lens, and a microlens array. The optical system may be the combination of some of these optical elements.

In a liquid crystal display device according to one embodiment of the present invention, a pixel area is divided into a plurality of display regions, and lights of different hues are sequentially supplied to each display region; thus, a full-color image is displayed. Therefore, at each time, the hue of light supplied to a display region can be made different from the hue of light supplied to the adjacent display region.

Consequently, given colors can be prevented from being uncombined and separately recognized, avoiding color breakup which is likely to occur when moving images are displayed unlike with the FS method. A liquid crystal display device according to one embodiment of the present invention does not require the use of a color filter, and thus can have high use efficiency of the light from the light supply portion and consume low power for the whole liquid crystal display device. In other words, one embodiment of the present invention can have the advantage offered by the FS method, i.e., low power consumption and avoid the disadvantage offered by the FS method, i.e., color breakup.

Further, in one embodiment of the present invention, one pixel can display images corresponding to given colors, achieving a higher-definition image than in the color filter method. Therefore, even with the 3D display method using an optical system, a reduction in the number of pixels in each row which contribute to image display can be avoided and a high-definition 3D image can be displayed.

DETAILED DESCRIPTION OF THE INVENTION

Hereinafter, embodiments of the present invention will be described in detail with reference to the accompanying drawings. It will be readily appreciated by those skilled in the art that modes and details of the present invention can be modified in various ways without departing from the spirit and scope of the present invention. The present invention therefore should not be construed as being limited to the following description of the embodiments.

(Embodiment 1)

<Structural Example of Liquid Crystal Display Device 100>

Figure 1A:
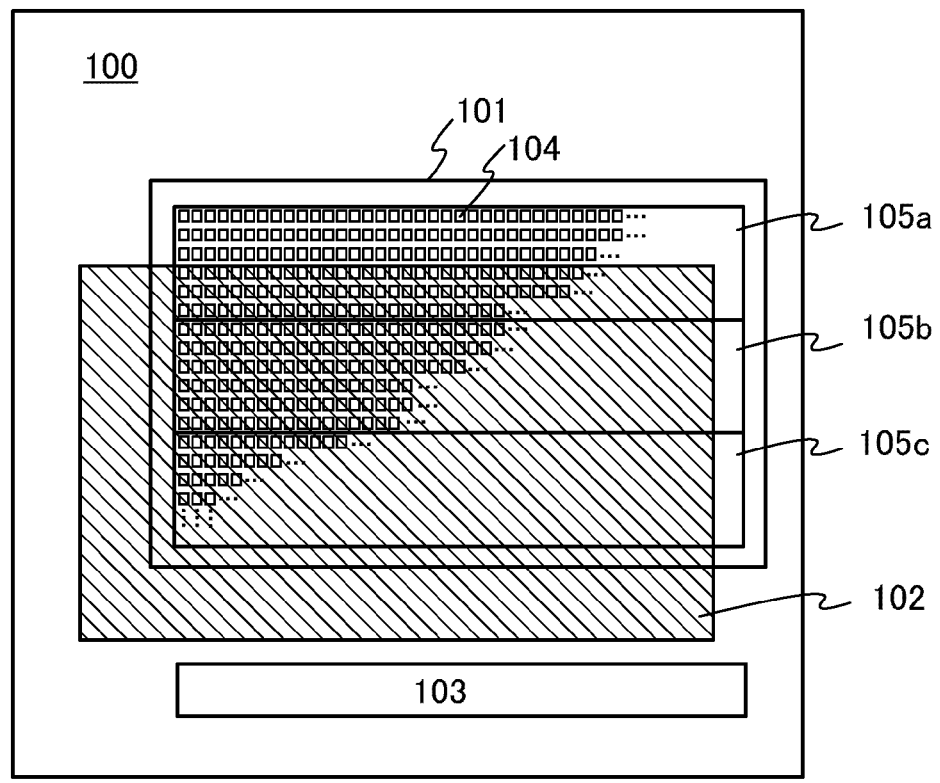
FIGS. 1A and 1B are a block diagram of a liquid crystal display device and a schematic diagram showing an embodiment of the arrangement of pixels, respectively.

FIG. 1A is a block diagram showing one embodiment of a liquid crystal display device according to one embodiment of the present invention. A liquid crystal display device 100 includes a pixel area 101 displaying an image, an optical system 102 controlling the travel direction of the light from the pixel area 101, and a light supply portion 103 supplying light to the pixel area 101.

The pixel area 101 includes a plurality of pixels 104. The pixel 104 includes a liquid crystal element. The liquid crystal element expresses a gradation in accordance with an image signal; thus, an image can be displayed on the pixel area 101.

The pixel area 101 is divided into a plurality of display regions. FIG. 1A illustrates the case where the pixel area 101 is divided into a first display region 105a, a second display region 105b, and a third display region 105c. Each display region includes a plurality of pixels 104. The plurality of pixels 104 includes right-eye pixels 104a (Rpix) for right eye and left-eye pixels 104b (Lpix) for left eye.

Figure 1B:
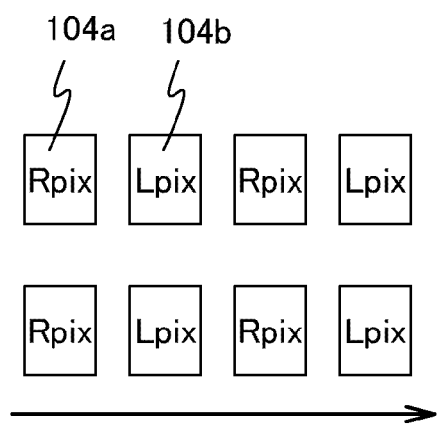

FIG. 1B schematically shows one embodiment of the arrangement of the pixels 104. In FIG. 1B, the right-eye pixel 104a (Rpix) corresponds to the pixel 104 for right eye, and the left-eye pixel 104b (Lpix) corresponds to the pixel 104 for left eye. The right-eye pixels 104a and the left-eye pixels 104b are alternately arranged in the direction in which the scan lines extend indicated by the arrow. The right-eye pixel 104a (Rpix) displays a right-eye image and the left-eye pixel 104b (Lpix) displays a left-eye image; thus, a 3D image can be displayed.

In the optical system 102, one or more optical elements such as a parallax barrier, a lenticular lens, and a microlens array can be used in combination. Note that the optical elements used in the optical system 102 are not limited to the above-stated optical elements; a liquid crystal display device according to one embodiment of the present invention can use any optical element by which the travel direction of the light from the right-eye pixel 104a (Rpix) and the travel direction of the light from the left-eye pixel 104b (Lpix) can be separately controlled. A liquid crystal panel can be used instead of a parallax barrier.

The optical system 102 allows the viewer to selectively see images, i.e., see right-eye images displayed on the right-eye pixels 104a (Rpix) with right eye and see left-eye images displayed on the left-eye pixels 104b (Lpix) with left eye. Thus, the viewer can recognize 3D images.

The light supply portion 103 includes a plurality of light sources emitting lights of different hues. The light sources emit light sequentially or simultaneously, thereby sequentially supplying light corresponding to a plurality of hues to the pixel area 101. The light source in the light supply portion 103 can be a cold cathode fluorescent lamp, a light-emitting diode (an LED), an OLED generating electroluminescence when an electric field is applied thereto, or the like.

<Structural Example of Pixel Area 101>

Figure 2:
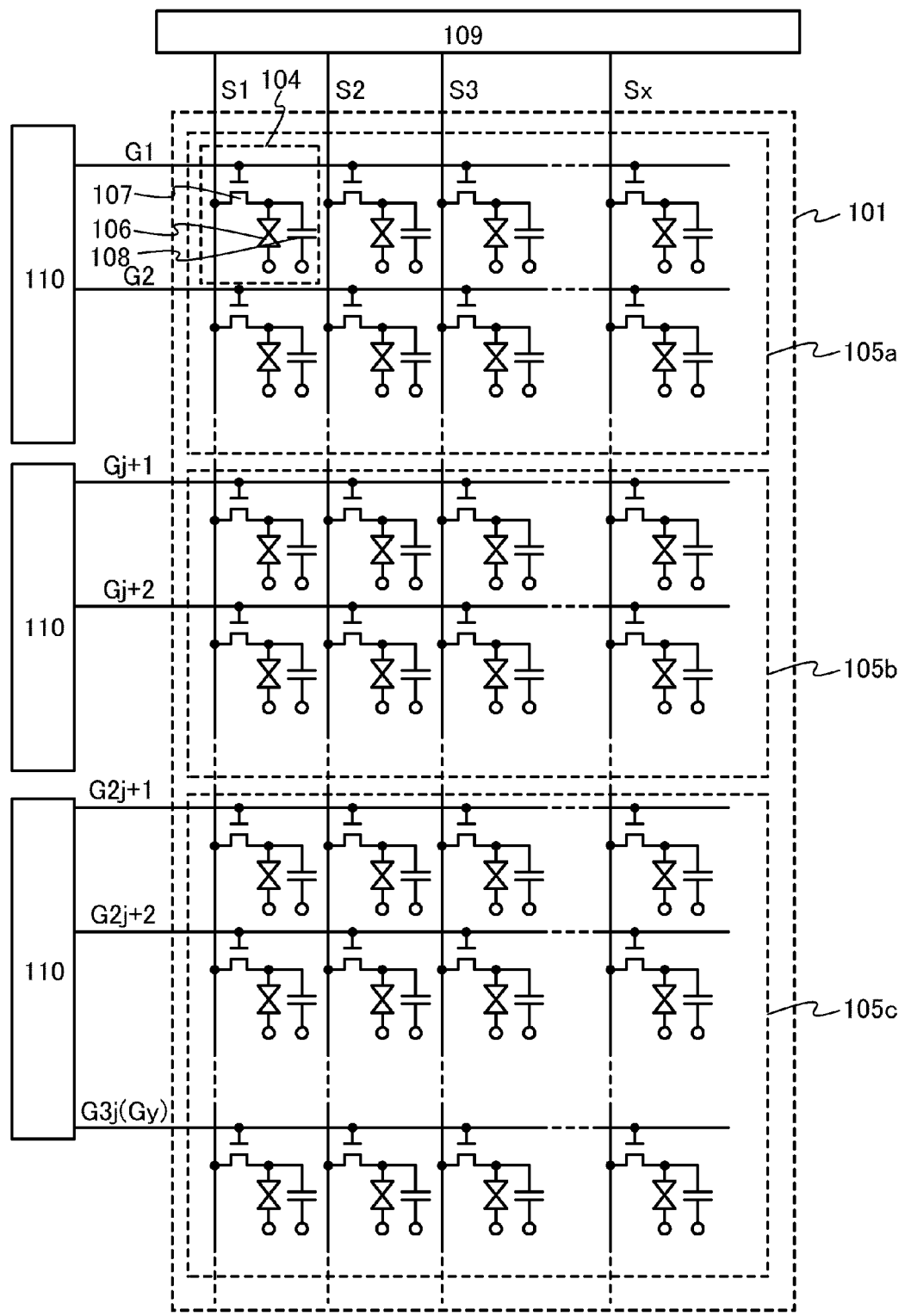
FIG. 2 is a diagram showing the configuration of a pixel area and driver circuits.

Next, the specific structure of the pixel area 101 will be described. FIG. 2 shows an example of the circuit configuration of the pixel area 101 and the configuration of the driver circuits controlling the operation of the pixel area 101.

In FIG. 2, the pixel area 101 includes a plurality of scan lines for selecting the pixels 104 and a plurality of signal lines for supplying image signals to the selected pixels 104.

Note that FIG. 2 illustrates the case where the pixel area 101 is divided into a first display region 105a, a second display region 105b, and a third display region 105c. The pixels 104 in the first display region 105a, the second display region 105b, and the third display region 105c are each electrically connected to at least one of signal lines S1 to Sx. Each pixel 104 in the first display region 105a is connected to at least one of scan lines G1 to Gj among scan lines G1 to Gy. Each pixel 104 in the second display region 105b is connected to at least one of scan lines Gj+1 to G2j among the scan lines G1 to Gy. Each pixel 104 in the third display region 105c is connected to at least one of scan lines G2j+1 to Gy (G3j) among the scan lines G1 to Gy.

Note that the supply of image signals to the signal lines is controlled by a signal line driver circuit 109, and the potentials of the scan lines are controlled by a scan line driver circuit 110. Note that FIG. 2 illustrates the case where three scan line driver circuits 110 control the potentials of the scan lines G1 to Gj in the first display region 105a, the potentials of the scan lines Gj+1 to G2j in the second display region 105b, and the potentials of the scan lines G2j+1 to Gy in the third display region 105c, respectively. However, one embodiment of the present invention is not limited to this structure; one scan line driver circuit 110 may control the potentials of the scan lines in all the display regions.

Each pixel 104 includes a liquid crystal element 106, a transistor 107 controlling the supply of an image signal to the liquid crystal element 106, a capacitor 108 for holding voltage between a pixel electrode and common electrode of the liquid crystal element 106. The liquid crystal element 106 includes the pixel electrode, the common electrode, and a liquid crystal layer containing a liquid crystal to which voltage between the pixel electrode and the common electrode is applied.

The transistor 107 controls whether the potential of the signal line is applied to the pixel electrode of the liquid crystal element 106. A predetermined reference potential is applied to the common electrode of the liquid crystal element 106.

The liquid crystal layer can use a liquid crystal material classified, for example, as a thermotropic liquid crystal or a lyotropic liquid crystal. Alternatively, the liquid crystal layer can use a liquid crystal material classified, for example, as a nematic liquid crystal, a smectic liquid crystal, a cholesteric liquid crystal, or a discotic liquid crystal. Alternatively, the liquid crystal layer can use a liquid crystal material classified, for example, as a ferroelectric liquid crystal or an anti-ferroelectric liquid crystal. Alternatively, the liquid crystal layer can use a liquid crystal material classified, for example, as a high-molecular liquid crystal such as a main-chain high-molecular liquid crystal, a side-chain high-molecular liquid crystal, a composite-type high-molecular liquid crystal, or a low-molecular liquid crystal. Alternatively, the liquid crystal layer can use a liquid crystal material classified, for example, as a polymer dispersed liquid crystal (PDLC).

Alternatively, a liquid crystal exhibiting a blue phase for which an alignment film is unnecessary may be used for the liquid crystal layer. A blue phase is one of liquid crystal phases, which is generated just before a cholesteric phase changes into an isotropic phase while temperature of cholesteric liquid crystal is increased. Since the blue phase is only generated within a narrow range of temperature, a chiral agent or an ultraviolet curable resin is added so that the temperature range is improved. The liquid crystal composition which includes a liquid crystal exhibiting a blue phase and a chiral agent is preferable because it has a small response time of less than or equal to 1 msec, has optical isotropy, which eliminates the need for the alignment process, and has a small viewing angle dependence.

Examples of applicable modes for driving the liquid crystal include a twisted nematic (TN) mode, a super twisted nematic (STN) mode, a vertical alignment (VA) mode, an in-plane switching (IPS) mode, an optically compensated birefringence (OCB) mode, a fringe field switching (FFS) mode, a blue phase mode, a transverse bend alignment (TBA) mode, a VA-IPS mode, an electrically controlled birefringence (ECB) mode, a ferroelectric liquid crystal (FLC) mode, and an anti ferroelectric liquid crystal (AFLC) mode.

Note that the names of the source terminal and the drain terminal of a transistor interchange depending on the polarity of the transistor or a difference between the levels of potentials applied to the electrodes. In general, in an n-channel transistor, an electrode to which a low potential is applied is called a source terminal, and an electrode to which a high potential is applied is called a drain terminal. Further, in a p-channel transistor, an electrode to which a low potential is applied is called a drain terminal, and an electrode to which a high potential is applied is called a source terminal. A specific connection relation of the transistor 107 and the liquid crystal element 106 will be described below by regarding one of a source electrode and a drain electrode as a first terminal and the other as a second terminal.

In addition, a source terminal of a transistor means a source region that is a part of an active layer or a source electrode connected to an active layer. Similarly, a drain terminal of a transistor means a drain region that is a part of an active layer or a drain electrode connected to an active layer.

Specifically, a gate electrode of the transistor 107 is connected to any one of the scan lines G1 to Gy. To which scan line the gate electrode is connected depends on the region (the first display region 105a, the second display region 105b, or the third display region 105c) containing the pixel 104 including the transistor 107. A first terminal of the transistor 107 is connected to any one of the signal lines S1 to Sx. A second terminal of the transistor 107 is connected to the pixel electrode of the liquid crystal element 106.

Note that the pixel 104 may further include another circuit element such as a transistor, a diode, a resistor, a capacitor, or an inductor, as needed.

Although FIG. 2 illustrates the case where one transistor 107 is used as a switching element in the pixel 15, one embodiment of the present invention is not limited to this configuration. A plurality of transistors serving as one switching element may be used. In the case where a plurality of transistors serve as one switching element, the plurality of transistors may be connected to each other in parallel, in series, or both in parallel and in series.

In this specification, the state where transistors are connected to each other in series means, for example, the state where only one of a first terminal and a second terminal of a first transistor is connected to only one of a first terminal and a second terminal of a second transistor. The state where transistors are connected to each other in parallel means the state where the first terminal of the first transistor is connected to the first terminal of the second transistor and the second terminal of the first transistor is connected to the second terminal of the second transistor.

Note that the term "connection" in this specification refers to electrical connection and indicates the state where the supply or transmission of current, potential, or voltage is possible. Therefore, a connection state means not only a direct connection state but also the state of indirect connection which is made through a circuit component such as wiring, a resistor, a diode, or a transistor such that the supply or transmission of current, potential, or voltage becomes possible.

Like a part of wiring serving as an electrode, one conductive film may have the functions of a plurality of components even when different components are connected to each other in a circuit diagram. The term "connection" in this specification also indicates such a case where one conductive film has the functions of a plurality of components.

In one embodiment of the present invention, the pixels 104 connected to odd-numbered signal lines such as signal lines S1, S3 . . . , among the signal lines S1 to Sx correspond to right-eye pixels, and the pixels 104 connected to even-numbered signal lines such as signal lines S2, S4 . . . , among the signal lines S1 to Sx correspond to left-eye pixels. Alternatively, the pixels 104 connected to odd-numbered signal lines may correspond to left-eye pixels and the pixels 104 connected to even-numbered signal lines may correspond to right-eye pixels.

<Example of Operation of Pixel Area 101>

Next, an example of the operation of the pixel area 101 in FIG. 2 will be described.

First, the scan line G1 is selected by inputting a pulse signal to the scan line G1. In each of the plurality of pixels 104 connected to the selected scan line G1, the transistor 107 is turned on. When the transistors 107 are in the on state, the potentials of image signals are applied to the signal lines S1 to Sx. Specifically, the potentials of image signals based on a right-eye image are applied to odd-numbered signal lines S1, S3 . . . and the potentials of image signals based on a left-eye image are applied to even-numbered signal lines S2, S4 . . . . Charges are stored on the capacitors 108 through the transistors 107 in the on state in accordance with the potentials of the image signals applied to the signal lines S1 to Sx. Further, the potentials of the image signals are applied to the pixel electrodes of the liquid crystal elements 106 through the transistors 107 in the on state.

The alignment of liquid crystal molecules in the liquid crystal element 106 changes in accordance with the value of a voltage applied between the pixel electrode and the counter electrode, so that the transmittance of the liquid crystal element 106 changes. Thus, the transmittance of the liquid crystal element 106 can be controlled by the potential of an image signal, so that the liquid crystal element 106 can express a gradation.

When the input of image signals to the signal lines S1 to Sx ends, the selection of the scan line G1 ends. When the selection of the scan line G1 ends, the transistors 107 in the pixels 104 including the scan line G1 are turned off. Then, the liquid crystal element 106 keeps displaying the gradation by holding voltage applied between the pixel electrode and the counter electrode.

Similarly, the scan lines G2 to Gy are sequentially selected, and the pixels connected to the scan lines G2 to Gy are sequentially subjected to the same operation as that performed while the scan line G1 is selected. With the above-described operation, in the first display region 105a, the second display region 105b, and the third display region 105c, the pixels 104 connected to the odd-numbered signal lines can display right-eye images and the pixels 104 connected to the even-numbered signal lines can display left-eye images.

Note that, in one embodiment of the present invention, the scan lines G1 to Gy are not necessarily selected in sequence. For example, the scan lines may be sequentially selected from each display one by one. Specifically, for example, the scan line G1 in the first display region 105a is selected to supply image signals to the pixels 104. Then, the scan line Gj+1 in the second display region 105b is selected to supply image signals to the pixels 104. Then, the scan line G2j+1 in the third display region 105c is selected to supply image signals to the pixels 104. Subsequently, the scan line G2 in the first display region 105a is selected to supply image signals to the pixels 104. Then, the scan line Gj+2 in the second display region 105b is selected to supply image signals to the pixels 104. Then, the scan line G2j+2 in the third display region 105c is selected to supply image signals to the pixels 104. The repeat of these operations enables image signals to be supplied to all the pixels.

<Example of Operation of Light Supply Portion 103>

Next, the operation of the light supply portion 103 in the liquid crystal display device 100 illustrated in FIG. 1 will be described.

The liquid crystal display device according to one embodiment of the present invention is driven so that one frame period may consist of a plurality of sub-frame periods. In the pixel area 101, every sub-frame period, image signals corresponding to given hues are supplied to respective display regions. Then, image signals corresponding to all the given hues are supplied to each display region within one frame period, so that one image is formed.

The light supply portion 103 switches, every sub-frame period, the hue of the light supplied to the display region. In other words, within one frame period, lights of all the given hues are supplied to each display region to synchronize with the supply of the image signals to the pixel area 101. In each sub-frame period, lights of different hues are supplied in parallel to at least two adjacent display regions.

Figure 3:
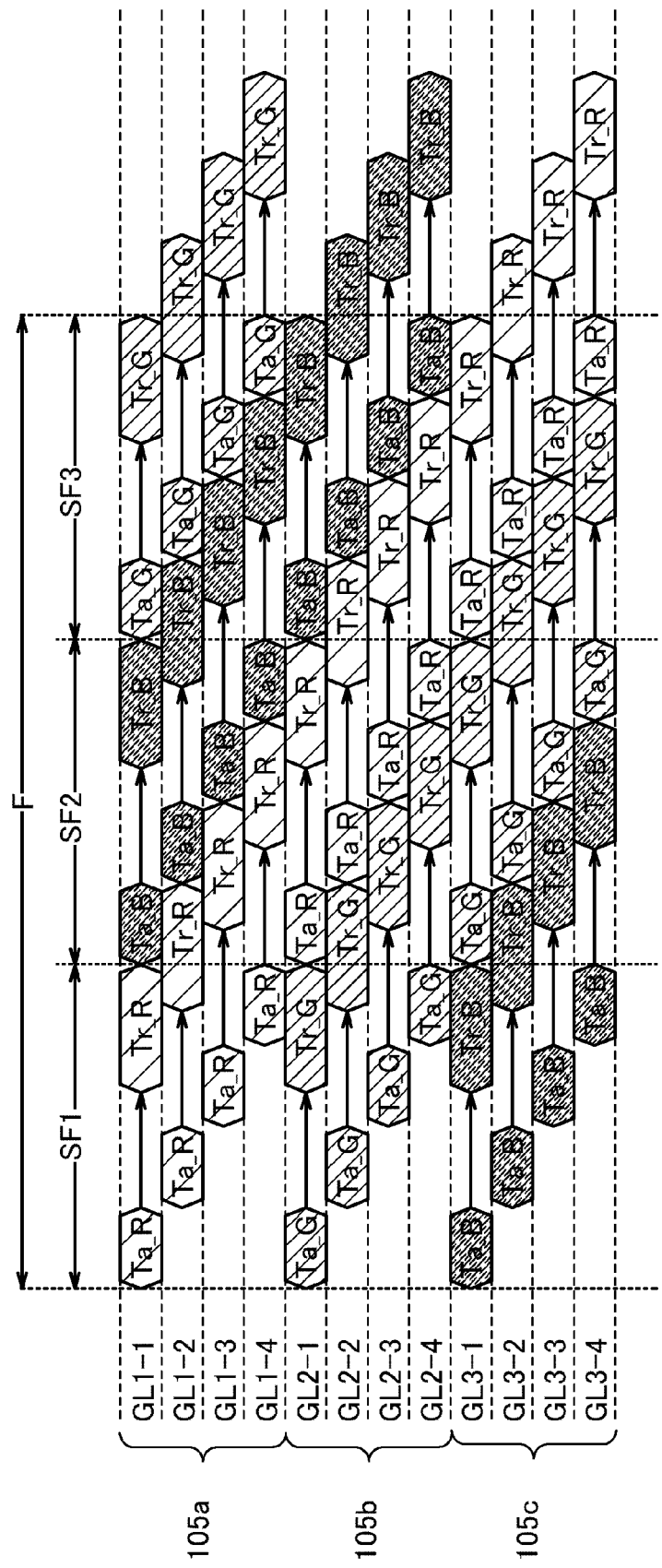
FIG. 3 is a diagram showing the timing of supplying image signals to the pixel area and the timing of supplying light from a light supply portion.

FIG. 3 illustrates the timing of supplying image signals to the pixel area 101 and the timing of supplying light from the light supply portion 103. Note that, in FIG. 3, the horizontal direction represents time, while the vertical direction represents the positions of the scan lines in the first display region 105a, the second display region 105b, and the third display region 105c. Note that FIG. 3 shows the case where the scan lines in each display region are divided into four groups. In other words, the scan lines G1 to Gj in the first display region 105a are divided into four groups GL1-1 to GL1-4; the scan lines Gj+1 to G2j in the second display region 105b are divided into four groups GL2-1 to GL2-4; and the scan lines G2j+1 to G3j in the third display region 105c are divided into four groups GL3-1 to GL3-4.

First, in the first sub-frame period SF1, image signals corresponding to a red color are supplied to the first display region 105a, image signals corresponding to a green color are supplied to the second display region 105b, and image signals corresponding to a blue color are supplied to the third display region 105c.

Specifically, in the first sub-frame period SF1 in FIG. 3, image signals corresponding to a red color are supplied to the pixels 104 connected to the scan line G1 that belongs to GL1-1. Then, image signals corresponding to a green color are supplied to the pixels 104 connected to the scan line Gj+1 that belongs to GL2-1. Then, image signals corresponding to a blue color are supplied to the pixels 104 connected to the scan line G2j+1 that belongs to GL3-1. Then, image signals corresponding to a red color are supplied to the pixels 104 connected to the scan line G2 that belongs to GL1-1.

Then, the pixels 104 connected to the scan lines that belong to GL1-1, the pixels 104 connected to the scan lines that belong to GL2-1, and the pixels 104 connected to the scan lines that belong to GL3-1 are sequentially subjected to the above-described operation.

After image signals corresponding to a red color are supplied to all the pixels 104 connected to the scan lines that belong to GL1-1, image signals corresponding to a red color are supplied to all the pixels 104 connected to the scan lines that belong to GL1-2, as in the case of GL1-1. After image signals corresponding to a green color are supplied to all the pixels 104 connected to the scan lines that belong to GL2-1, image signals corresponding to a green color are supplied to all the pixels 104 connected to the scan lines that belong to GL2-2, as in the case of GL2-1. After image signals corresponding to a blue color are supplied to all the pixels 104 connected to the scan lines that belong to GL3-1, image signals corresponding to a blue color are supplied to all the pixels 104 connected to the scan lines that belong to GL3-2, as in the case of GL3-1.

In the first sub-frame period SF1, by the repeat of these operations, image signals corresponding to a red color are eventually supplied to all the pixels 104 in the first display region 105a. Further, image signals corresponding to a green color are supplied to all the pixels 104 in the second display region 105b. Further, image signals corresponding to a blue color are supplied to all the pixels 104 in the third display region 105c.

On the other hand, after image signals corresponding to a red color are supplied to all the pixels 104 connected to the scan lines that belong to GL1-1, the light supply portion 103 supplies red light to these pixels 104. In FIG. 3, the period in which image signals corresponding to a red color are supplied to the pixels 104 is represented as a write period Ta_R, and the period in which red lights are supplied from the light supply portion 103 to the pixels 104 is represented as a display period Tr_R. Note that the supply of light to the pixels 104 connected to the scan lines that belong to GL1-1 can be done concurrently with the supply of image signals to the pixels 104 connected to scan lines other than the scan lines that belong to GL1-1.

Similarly, after image signals corresponding to a green color are supplied to all the pixels 104 connected to the scan lines that belong to GL2-1, the light supply portion 103 supplies green light to these pixels 104. In FIG. 3, the period in which image signals corresponding to a green color are supplied to the pixels 104 is represented as a write period Ta_G, and the period in which green lights are supplied from the light supply portion 103 to the pixels 104 is represented as a display period Tr_G. Note that the supply of light to the pixels 104 connected to the scan lines that belong to GL2-1 can be done concurrently with the supply of image signals to the pixels 104 connected to scan lines other than the scan lines that belong to GL2-1.

Similarly, after image signals corresponding to a blue color are supplied to all the pixels 104 connected to the scan lines that belong to GL3-1, the light supply portion 103 supplies blue light to these pixels 104. In FIG. 3, the period in which image signals corresponding to a blue color are supplied to the pixels 104 is a write period Ta_B, and the period in which blue lights are supplied from the light supply portion 103 to the pixels 104 is a display period Tr_B. Note that the supply of light to the pixels 104 connected to the scan lines that belong to GL3-1 can be done concurrently with the supply of image signals to the pixels 104 connected to scan lines other than the scan lines that belong to GL3-1.

Then, as in the case of GL1-1, red lights are supplied from the light supply portion 103 to all the pixels 104 connected to the scan lines that belong to GL1-2 to GL1-4. Consequently, part of an image corresponding to a red color is eventually displayed on the first display region 105a in the first sub-frame period SF1. Then, as in the case of GL2-1, green lights are supplied from the light supply portion 103 to all the pixels 104 connected to the scan lines that belong to GL2-2 to GL2-4. Consequently, part of an image corresponding to a green color is eventually displayed on the second display region 105b in the first sub-frame period SF1. Then, as in the case of GL3-1, blue lights are supplied from the light supply portion 103 to all the pixels 104 connected to the scan lines that belong to GL3-2 to GL3-4. Consequently, part of an image corresponding to a blue color is eventually displayed on the third display region 105c in the first sub-frame period SF1.

Note that FIG. 3 shows the case where, after an image signal is supplied, light is supplied to the pixel 104 after changes in the alignment of liquid crystal molecules due to the potential of the image signal in the liquid crystal layer finish. For this reason, for example, a predetermined period of time is placed between the end of a write period Ta_R and the start of a display period Tr_R. Such a predetermined period of time can be determined according to the response time of the liquid crystal.

FIG. 3 further shows, as an example, the case where the scan lines may be sequentially selected from each display one by one and image signals are supplied to the pixels connected to the selected scan lines. However, in one embodiment of the present invention, the scan lines G1 to Gy may be sequentially selected and image signals are supplied to the pixels connected to the selected scan line.

The same operation as in the first sub-frame period SF1 is repeated in a second sub-frame period SF2 and a third sub-frame period SF3. Note that, in the second sub-frame period SF2, image signals corresponding to a blue color and blue lights are supplied to the first display region 105a, image signals corresponding to a red color and red lights are supplied to the second display region 105b, and image signals corresponding to a green color and green lights are supplied to the third display region 105c. In the third sub-frame period SF3, image signals corresponding to a green color and green lights are supplied to the first display region 105a, image signals corresponding to a blue color and blue lights are supplied to the second display region 105b, and image signals corresponding to a red color and red lights are supplied to the third display region 105c.

The first to third sub-frame periods SF1 to SF3 which correspond to one frame period end for the first display region 105a, the second display region 105b, and the third display region 105c, and a full-color image is displayed on the pixel area 101. Note that a full-color image is an image displayed by gradation of a plurality of different hues (colors).

FIG. 3 shows, as an example, the case where the scan lines in each display region are divided into four groups. However, the scan lines in each display region are not necessarily divided into four groups; they may be divided into a number other than four, or even not divided.

In FIG. 3, once the supply of image signals to one group ends, the supply of light from the light supply portion to that group starts. This can extend the display period or shorten one frame period as compared to starting the supply of light from the light supply portion once the supply of image signals to all the pixels in the pixel area ends.

In FIG. 3, in each write period, there is no supply of light from the light supply portion 103 to the pixels 104. However, soon after each write period starts, changes in the alignment of the liquid crystal molecules in the liquid crystal layer are small. For this reason, during a period from the start of each write period to the time when the viewer sees changes in the alignment of the liquid crystal molecules, light from the light supply portion 103 may be supplied to the pixels 104. Note that the hue of the light supplied to the pixels 104 at the beginning of a write period is the same as the hue of the light used in the display period followed by the write period.

Figure 4:
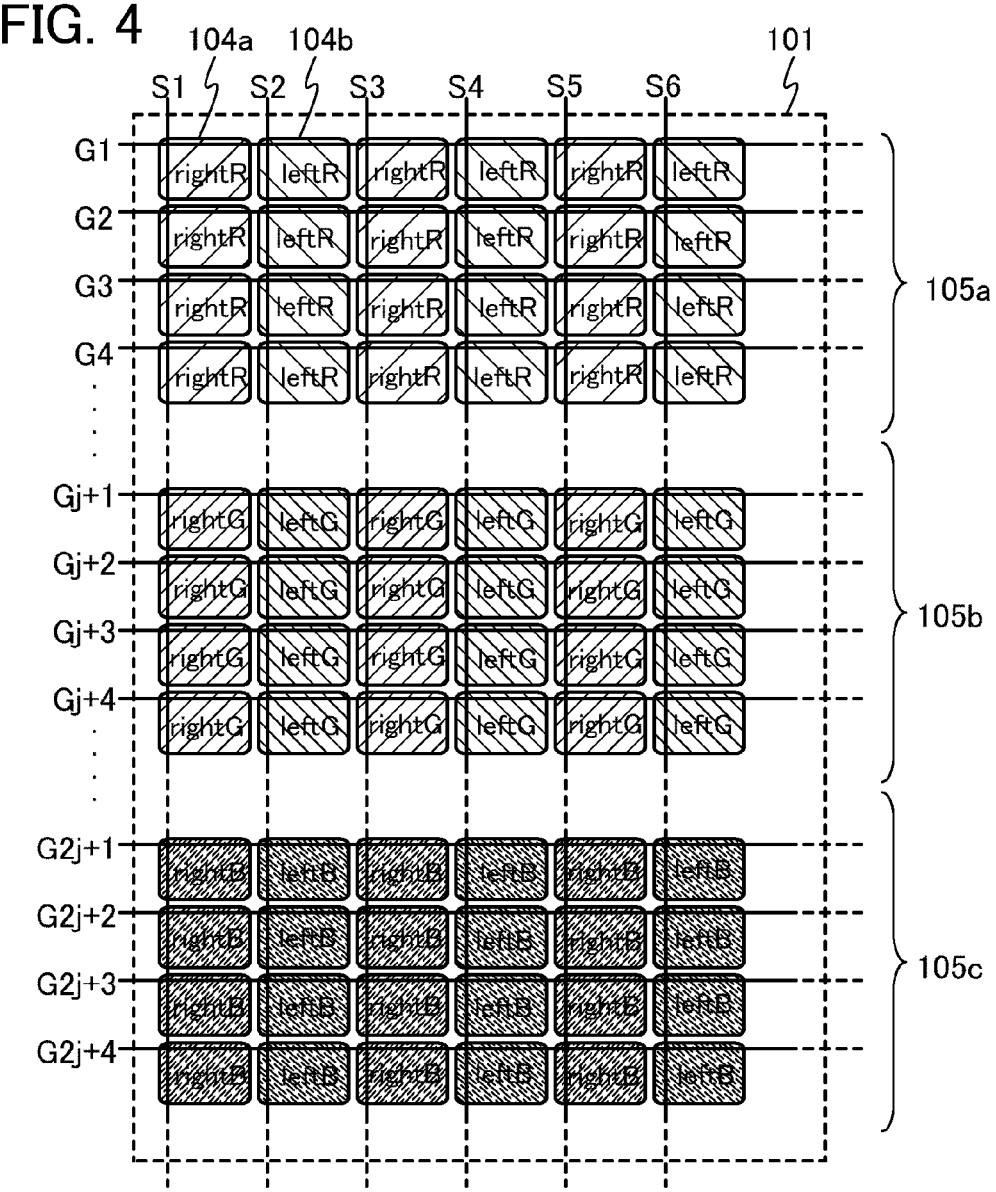
FIG. 4 is a diagram showing the arrangement of the pixels in each display region.

As described above, each display region includes right-eye pixels and left-eye pixels. Image signals having the image data of a right-eye image are input to the right-eye pixels, while image signals having the image data of a left-eye image are input to the left-eye pixels. FIG. 4 schematically shows, as an example, the arrangement of the pixels 104 in the first display region 105a, the second display region 105b, and the third display region 105c shown in FIG. 2, and the image data of an image signal input to the pixels 104.

In FIG. 4, among the pixels 104 included in the first display region 105a and connected to the scan lines G1 to Gj, the right-eye pixels 104a connected to the odd-numbered signal lines S1, S3, S5, and the like are supplied with image signals (right R) having the image data of a right-eye image corresponding to a red color. Further, among the pixels 104 included in the first display region 105a and connected to the scan lines G1 to Gj, the left-eye pixels 104b connected to the even-numbered signal lines S2, S4, S6, and the like are supplied with image signals (left R) having the image data of a left-eye image corresponding to a red color.

In FIG. 4, image signals (right G) having the image data of a right-eye image corresponding to a green color are supplied to the right-eye pixels 104a connected to the odd-numbered signal lines S1, S3, S5, and the like, among the pixels 104 included in the second display region 105b and connected to the scan lines Gj+1 to G2j. Further, image signals (left G) having the image data of a left-eye image corresponding to a green color are supplied to the left-eye pixels 104b connected to the even-numbered signal lines S2, S4, S6, and the like, among the pixels 104 included in the second display region 105b and connected to the scan lines Gj+1 to G2j.

In FIG. 4, image signals (right B) having the image data of a right-eye image corresponding to a blue color are supplied, among the pixels 104 included in the third display region 105c and connected to the scan lines G2j+1 to G3j, to the right-eye pixels 104a connected to the odd-numbered signal lines S1, S3, S5, and the like. Further, image signals (left B) having the image data of a left-eye image corresponding to a blue color are supplied, among the left-eye pixels 104b included in the third display region 105c and connected to the scan lines G2j+1 to G3j, to the left-eye pixels 104b connected to the even-numbered signal lines S2, S4, S6, and the like.

Thus, image signals having the image data of right-eye images corresponding to given hues are supplied to the right-eye pixels 104a, and image signals having the image data of left-eye images corresponding to given hues are supplied to the left-eye pixels 104b, so that a full-color 3D image can be displayed.

Note that although in the above-described driving method, light sources corresponding to thee colors: red (R), green (G), and blue (B) are used for the light supply portion 103, one embodiment of the present invention is not limited to this. In one embodiment of the present invention, a light source supplying light of any color can be used for the light supply portion 103. For example, a combination of light sources of four colors: red (R), green (G), blue (B), and white (W), a combination of light sources of four colors: red (R), green (G), blue (B), and yellow (Y), a combination of light sources of three colors: cyan (C), magenta (M), and yellow (Y), or the like can be used for the light supply portion 103.

In addition, a light source emitting white (W) light may further be provided in the light supply portion 103 instead of forming white (W) light by mixing colors. The light source emitting white (W) light has high emission efficiency; therefore, the use of the light source for the light supply portion 103 can reduce power consumption. In the case where the light supply portion 103 includes light sources of two complementary colors (for example, in the case where the light source includes light sources of two colors: blue (B) and yellow (Y)), the two colors are mixed; thus, white (W) light can be created. Alternatively, a combination of light sources of six colors: pale red (R), pale green (G), pale blue (B), deep red (R), deep green (G), and deep blue (B), or a combination of light sources of six colors: red (R), green (G), blue (B), cyan (C), magenta (M), and yellow (Y) can be used.

Note that, for example, colors that can be expressed using the light sources of red (R), green (G), and blue (B) are limited to colors existing in the triangle made by the three points on the chromaticity diagram which correspond to the emission colors of the respective light sources. Therefore, as in the case where the light sources of red (R), green (G), blue (B), and yellow (Y) are used, by additionally providing a light source of a color existing outside the triangle on the chromaticity diagram, the range of the colors which can be expressed in the liquid crystal display device can be expanded, so that color reproducibility can be enhanced.

For example, in addition to the light sources of red (R), green (G), and blue (B), a light source emitting the following color can be used for the light source: deep blue (DB) represented by a point positioned substantially outside the triangle in a direction from the center of the chromaticity diagram toward the point on the chromaticity diagram corresponding to the blue-light-emitting element B; or deep red (DR) represented by a point positioned substantially outside the triangle in a direction from the center of the chromaticity diagram toward the point corresponding to red (R) on the chromaticity diagram.

In order to display a full-color image using a plurality of light sources having different hues, the plurality of light sources need to be switched to sequentially emit light unlike in the case where a light source of a single color and a color filter are used in combination. In addition, a frequency at which the light sources are switched needs to be set higher than a frame frequency used in the case of using a light source of a single color. For example, assuming that the frame frequency used in the case of a light source of a single color is 60 Hz, when the display device is driven using light sources corresponding to red, green, and blue, the frequency at which the light sources are switched is 180 Hz which is three times as high as the frame frequency. The driver circuits are operated in accordance with the frequency at which the light sources are switched, i.e., at an extremely high frequency. However, the response time of a liquid crystal exhibiting a blue phase is as small as 1 msec or less, as described above. Therefore, the use of a liquid crystal exhibiting a blue phase for a liquid crystal layer allows an image signal to be supplied to a pixel at high speed and increases frame frequency. As in one embodiment of the present invention, particularly in the case where one frame period includes a plurality of sub-frame periods, an image signal is supplied to the pixel area more frequently than that in a color filter method; thus, the frame frequency easily decrease. However, in a liquid crystal display device according to one embodiment of the present invention, a liquid crystal exhibiting a blue phase is used for a liquid crystal layer included in a liquid crystal element, preventing the decrease in frame frequency and the occurrence of color breakup and flicker.

<Structural Example of Optical System 102>

In one embodiment of the present invention, the travel direction of the light from the pixel area 101 is controlled by the optical system 102. As described above, the optical system 102 is, for example, an optical element controlling the travel direction of light, such as a parallax barrier, a lenticular lens, and a microlens array, or a liquid crystal panel.

Figure 5:
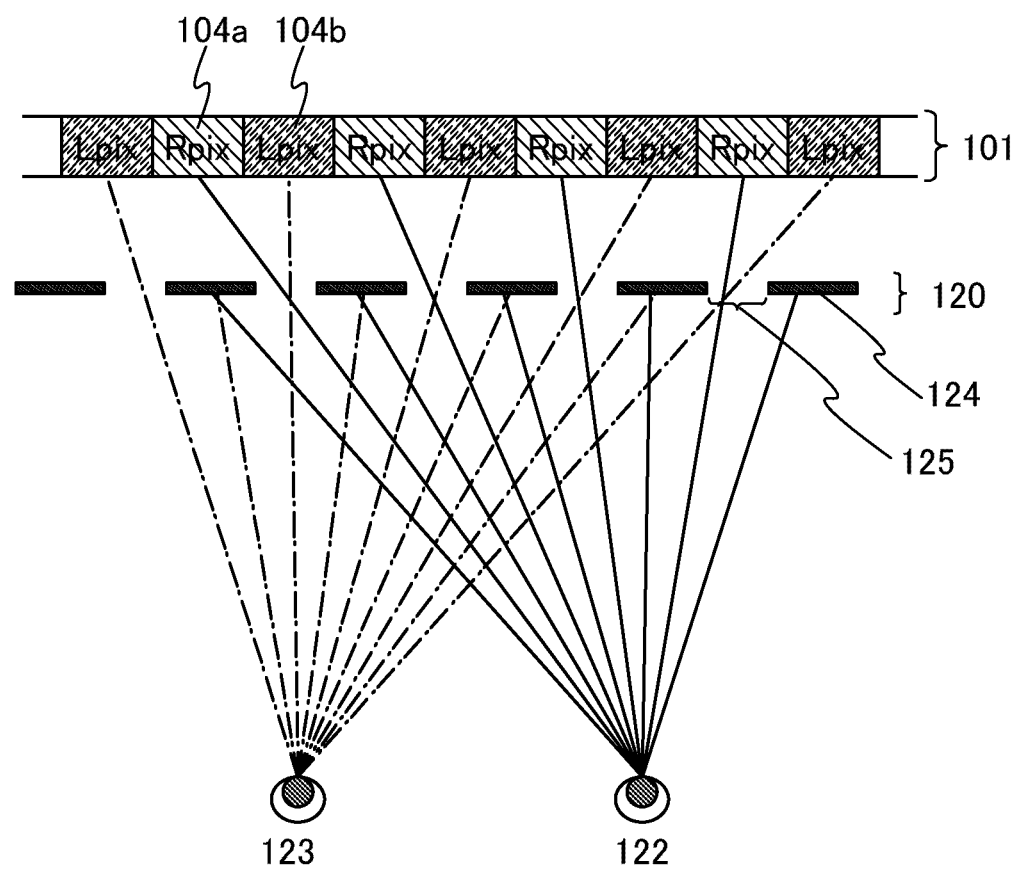
FIG. 5 is a diagram showing the positional relation between the pixel area, a parallax barrier, and the right eye and left eye of the viewer.

FIG. 5 shows the positional relation between the pixel area 101, a parallax barrier 120, and a right eye 122 and a left eye 123 of the viewer.

FIG. 5 shows, among the plurality of pixels in the pixel area 101, a row of pixels connected to a given scan line. A row of pixels shown in FIG. 5 include right-eye pixels 104a (Rpix) and left-eye pixels 104b (Lpix) alternately arranged.

FIG. 5 shows the case where the parallax barrier 120 is used as an optical system. The parallax barrier 120 has light-blocking portions 124 blocking light and openings 125 transmitting light alternately arranged. The parallax barrier 120 is provided in the path of the light traveling between the pixel area 101 and each of the right eye 122 and left eye 123 of the viewer.

Part of light emitted from the right-eye pixel 104a (Rpix) and left-eye pixel 104b (Lpix) in the pixel area 101 passes through the openings 125 in the parallax barrier 120 and enters the right eye 122 or left eye 123 of the viewer. By optimizing the relation among the shapes or sizes of the openings 125, the size of the pixel area 101, and the distance between the pixel area 101 and each of the right eye 122 and the left eye 123, light from the right-eye pixels 104a (Rpix) and light from the left-eye pixels 104b (Lpix) are selectively allowed to enter the right eye 122 and the left eye 123, respectively. Consequently, a 3D image composed of a right-eye image and a left-eye image can be recognized by the viewer.

Note that the parallax barrier 120 may be formed in the liquid crystal panel including the pixel area 101.

Figure 6:
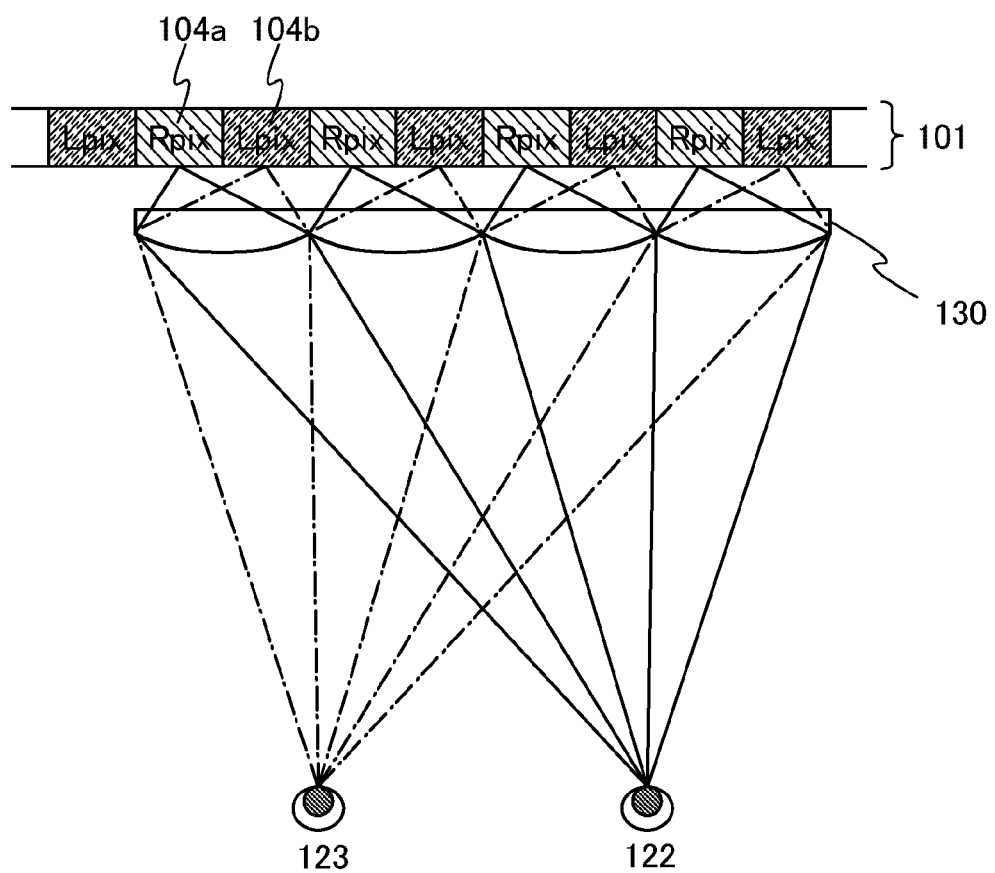
FIG. 6 is a diagram showing the positional relation between the pixel area, a lenticular lens, and the right eye and left eye of the viewer.

Next, the case where a lenticular lens is used as an optical system will be described. FIG. 6 shows the positional relation between the pixel area 101, a lenticular lens 130, and the right eye 122 and left eye 123 of the viewer.

Like FIG. 5, FIG. 6 shows, among the plurality of pixels in the pixel area 101, a row of pixels connected to a given scan line. A row of pixels shown in FIG. 6 include right-eye pixels 104a (Rpix) and left-eye pixels 104b (Lpix) alternately arranged.

Figure 7A:
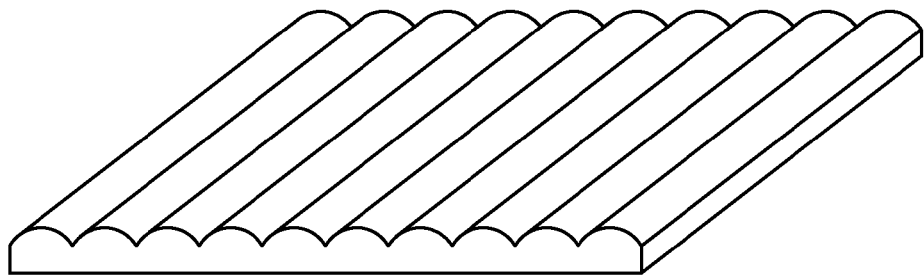
FIGS. 7A and 7B are perspective views of a lenticular lens and a microlens array, respectively.

FIG. 7A is a perspective view of the lenticular lens 130. The lenticular lens 130 has a plurality of continuous hog-backed (half round column) lens. Light is gathered into a half round convex portion where its travel direction is controlled.

In FIG. 6, the longitudinal direction for the convex portions of the lenticular lens 130 is the direction in which one scan line extends, which means it intersects with the direction in which the right-eye pixels 104a (Rpix) and the left-eye pixels 104b (Lpix) are arranged. The lenticular lens 130 is provided in the path of the light traveling between the pixel area 101 and each of the right eye 122 and left eye 123 of the viewer.

Part of light emitted from the right-eye pixel 104a (Rpix) and left-eye pixel 104b (Lpix) in the pixel area 101 is gathered by the lenticular lens 130 and enters the right eye 122 or left eye 123 of the viewer. By optimizing the focus depth of the lenticular lens 130, light from the right-eye pixels 104a (Rpix) and light from the left-eye pixels 104b (Lpix) are selectively allowed to enter the right eye 122 and the left eye 123, respectively. Consequently, a 3D image composed of a right-eye image and a left-eye image can be recognized by the viewer.

Note that also in the case where a microlens array is used as the optical system, as in the case where a lenticular lens is used, light is gathered into each convex portion of the lens, so that light from the left-eye pixels 104b (Lpix) is allowed to selectively enter the left eye 123.

Figure 7B:
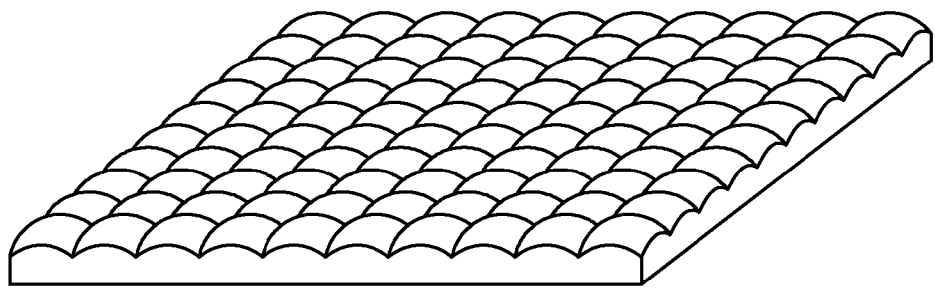

FIG. 7B is the perspective view of a microlens array 140. The microlens array 140 has a plurality of continuous plano-convex lens arranged in a matrix.

By using an optical system that does not block light and is capable of using light effectively, such as a lenticular lens or a microlens array, the luminance of a 3D image is prevented from being significantly less than the luminance of a 2D image.

On the other hand, a parallax barrier is easily aligned with respect to the pixels and easily fabricated as compared with such a lenticular lens or a microlens array.

In a liquid crystal display device according to one embodiment of the present invention, a pixel area is divided into a plurality of regions, and lights of different hues are sequentially supplied to each region; thus, a full-color image is displayed. Therefore, at each time, the hue of light supplied to a display region can be made different from the hue of light supplied to the adjacent display region. Consequently, given colors can be prevented from being uncombined and separately recognized, avoiding color breakup which is likely to occur when moving images are displayed unlike with the FS method. A liquid crystal display device according to one embodiment of the present invention does not require the use of a color filter, and thus can increase the use efficiency of the light from the light supply portion and reduce the power consumption of the whole liquid crystal display device. In other words, one embodiment of the present invention can have the advantage offered by the FS method, i.e., low power consumption and avoid the disadvantage offered by the FS method, i.e., color breakup.

Further, in one embodiment of the present invention, one pixel can display given colors, achieving a higher-definition image than in a color filter method. Therefore, even with the 3D display method using an optical system, a reduction in the number of pixels in each row which contribute to image display is avoided and high-definition 3D images can be displayed.

(Embodiment 2)

In this specification, a liquid crystal display device may contain an external circuit such as a controller. In this embodiment, the structure of an external circuit contained in a liquid crystal display device according to one embodiment of the present invention and the structure of a driver circuit controlling the operation of the pixel area are described with examples.

Figure 8:
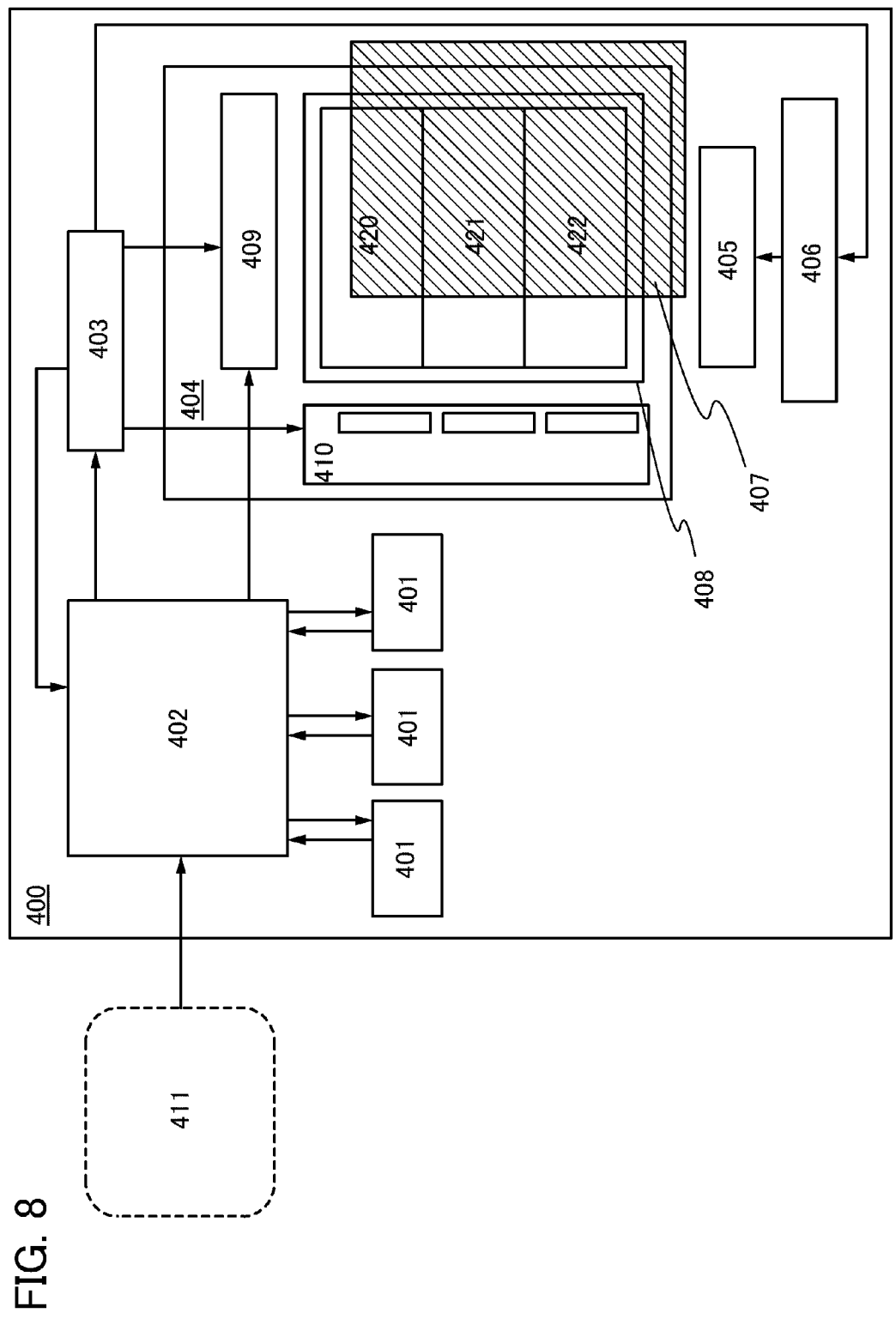
FIG. 8 is a block diagram showing the structure of a liquid crystal display device.

FIG. 8 is a block diagram showing an example of the structure of a liquid crystal display device 400. Although the block diagram shows elements classified according to their functions in independent blocks, it may be practically difficult to completely separate the elements according to their functions and, in some cases, one element may be involved in a plurality of functions.

As illustrated in FIG. 8, the liquid crystal display device 400 in this embodiment includes a plurality of image memories 401, an image processing circuit 402, a controller 403, a liquid crystal panel 404, a light supply portion 405, a light supply portion control circuit 406, and an optical system 407.

Image data corresponding to a full-color image (full-color image data 411) is input to the liquid crystal display device 400. The image processing circuit 402 writes the full-color image data 411 to the plurality of image memories 401 and reads the full-color image data 411 from the plurality of image memories 401. The full-color image data 411 includes image data corresponding to a plurality of hues. Image data corresponding to given hues are stored in the respective image memories 401.

As the image memories 401, memory circuits such as dynamic random access memories (DRAMs) or static random access memories (SRAMs), for example, can be used. Alternatively, as the image memories 401, video RAMs (VRAMs) may be used.

Image data corresponding to given hues, which are stored in the plurality of image memories 401, are read from the image processing circuit 402 according to instruction from the controller 403. Image data corresponding to given hues, which are read from the plurality of image memories 401, are transmitted to the liquid crystal panel 404.

In addition, the controller 403 supplies the liquid crystal panel 404 with driving signals synchronized with the full-color image data 411, and/or a power supply potential to be used when the full-color image is displayed.

The liquid crystal panel 404 includes a pixel area 408 in which each pixel includes a liquid crystal element, and driver circuits such as a signal line driver circuit 409 and a scan line driver circuit 410. The pixel area 408 includes a plurality of display regions. FIG. 8 illustrates the case where the pixel area 408 includes a first display region 420, a second display region 421, and a third display region 422.

Image data corresponding to given hues, which are input to the liquid crystal panel 404, are transmitted to the signal line driver circuit 409. Driving signals and/or a power supply potential from the controller 403 is supplied to the signal line driver circuit 409 and the scan line driver circuit 410.

Note that the driving signals include a signal line driver circuit start pulse signal SSP and a signal line driver circuit clock signal SCK which control the operation of the signal line driver circuit 409; and a latch signal LP, a scan line driver circuit start pulse GSP, a scan line driver circuit clock signal GCK, and a pulse width control signal PWC which control the operation of the scan line driver circuit 410.

A plurality of light sources emitting lights of different hues is provided in the light supply portion 405. The controller 403 controls drive of the light sources in the light supply portion 405 through the light supply portion control circuit 406.

Figure 9:
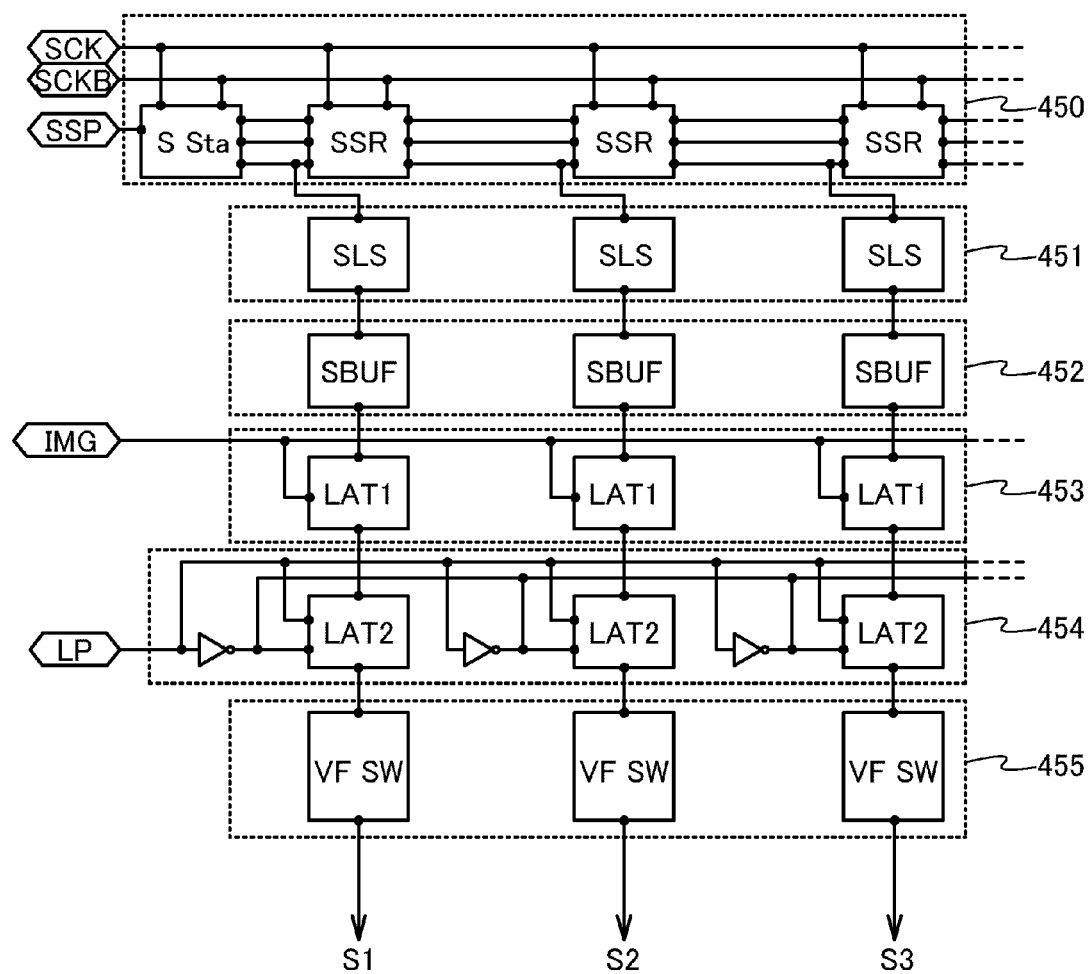
FIG. 9 is a diagram showing the configuration of a signal line driver circuit.

Next, the structure of the signal line driver circuit 409 will be described. FIG. 9 shows an example of the configuration of the signal line driver circuit 409. The signal line driver circuit 409 shown in FIG. 9 includes a shift register 450, a level shifter 451, a digital buffer 452, a first memory circuit 453, a second memory circuit 454, and an analog buffer 455.

Next, the operation of the signal line driver circuit 409 will be described. When the start pulse signal SSP, the clock signal SCK, and the clock signal SCKB having the opposite polarity to the clock signal SCK are input to the shift register 450, the shift register 450 generates timing signals having sequential shifts in their pulses.

A timing signal output from the shift register 450 is input to the level shifter 451 where its potential amplitude is adjusted, and then is input to the first memory circuit 453 through the digital buffer 452.

Image signals IMG are input to the first memory circuit 453. When a timing signal is input to the first memory circuit 453, the image signals IMG are sampled in response to the pulse of the timing signal and sequentially supplied to a plurality of memory elements included in the first memory circuit 453. In other words, the image signals IMG input to the signal line driver circuit 409 in series are supplied to the first memory circuit 453 in parallel. The image signals IMG supplied to the first memory circuit 453 are held.

Note that either one of the following methods is employed: the method in which the image signals IMG are sequentially supplied to a plurality of memory elements included in the first memory circuit 453; and the so-called multiplexing drive in which the plurality of memory elements included in the first memory circuit 453 are divided into several groups and image signals IMG are input to the groups in parallel. Note that the number of groups is called division number. For example, in the case where the memory elements are divided into four groups, multiplexing drive is performed with four divisions.

A latch signal LP is input to the second memory circuit 454. After the supply of the image signals IMG to the first memory circuit 453 ends, the image signals IMG held in the first memory circuit 453 are supplied to the second memory circuit 454 at once and held therein in response to the pulse of a latch signal LP input to the second memory circuit 454 in a flyback period. After the first memory circuit 453 outputs the image signals IMG to the second memory circuit 454, the next image signals IMG are sequentially supplied to the first memory circuit 453 in response to a timing signal from the shift register 450. In one line period of this second round, the image signals IMG supplied to and held in the second memory circuit 454 are transmitted to the signal lines through the analog buffer 455.

Figure 10:
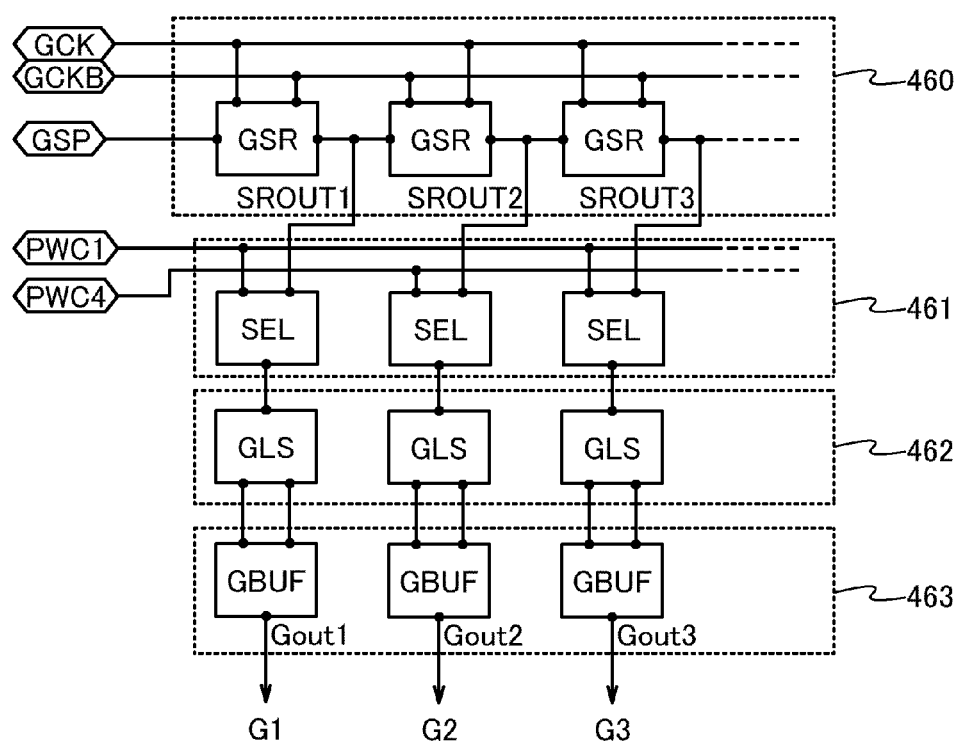
FIG. 10 is a diagram showing the structure of a scan line driver circuit.

Next, the structure of each scan line driver circuit 410 will be described. FIG. 10 shows an example of the structure of the scan line driver circuit 410. The scan line driver circuit 410 shown in FIG. 10 includes a shift register 460, a selector 461, a level shifter 462, and a digital buffer 463.

The operation of the scan line driver circuit 410 shown in FIG. 10 will be described with reference to the timing diagram of FIG. 11. In the scan line driver circuit 410, when a start pulse signal GSP, a clock signal GCK, and a clock signal GCKB having the opposite polarity to the clock signal GCK are input to the shift register 460, the shift register 460 generates scan signals SROUT having sequential shifts in their pulses.

Note that FIG. 10 shows the case where the shift register 460 includes a plurality of flip flops GSR. Each of the plurality of flip flops GSR outputs a scan signal SROUT. Specifically, the first flip flop GSR outputs a scan signal SROUT1. The second flip flop GSR outputs a scan signal SROUT2. The third flip flop GSR outputs a scan signal SROUT3. This means, if the shift register 460 has y flip flops GSR, the shift register 460 outputs scan signals SROUT1 to SROUTy.

Note that FIG. 10 shows one of the plurality of scan line driver circuits 410 as an example. When the liquid crystal display device 400 includes three scan line driver circuits 410, scan signals SROUT are output from each of the shift registers 460 in these three scan line driver circuit 410. For example, the shift register 460 in the first scan line driver circuit 410 outputs scan signals SROUT1 to SROUTj. The shift register 460 in the second scan line driver circuit 410 outputs scan signals SROUTj+1 to scan signal SROUT2j. The shift register 460 in the third scan line driver circuit 410 outputs scan signals SROUT2j+1 to SROUT3j.

The scan signals SROUT output from the shift register 460 are input to the selector 461. The pulse width control signal PWC is also input to the selector 461. The selector 461 controls the output of the potential of the pulse width control signal PWC in accordance with the pulses of the scan signals SROUT, and generates selection signals Gout.

Note that FIG. 10 shows one of the plurality of scan line driver circuits 410 as an example. When the liquid crystal display device 400 includes three scan line driver circuits 410, pulse width control signals PWC1 to PWC6 are used as shown in FIG. 11.

Figure 11:
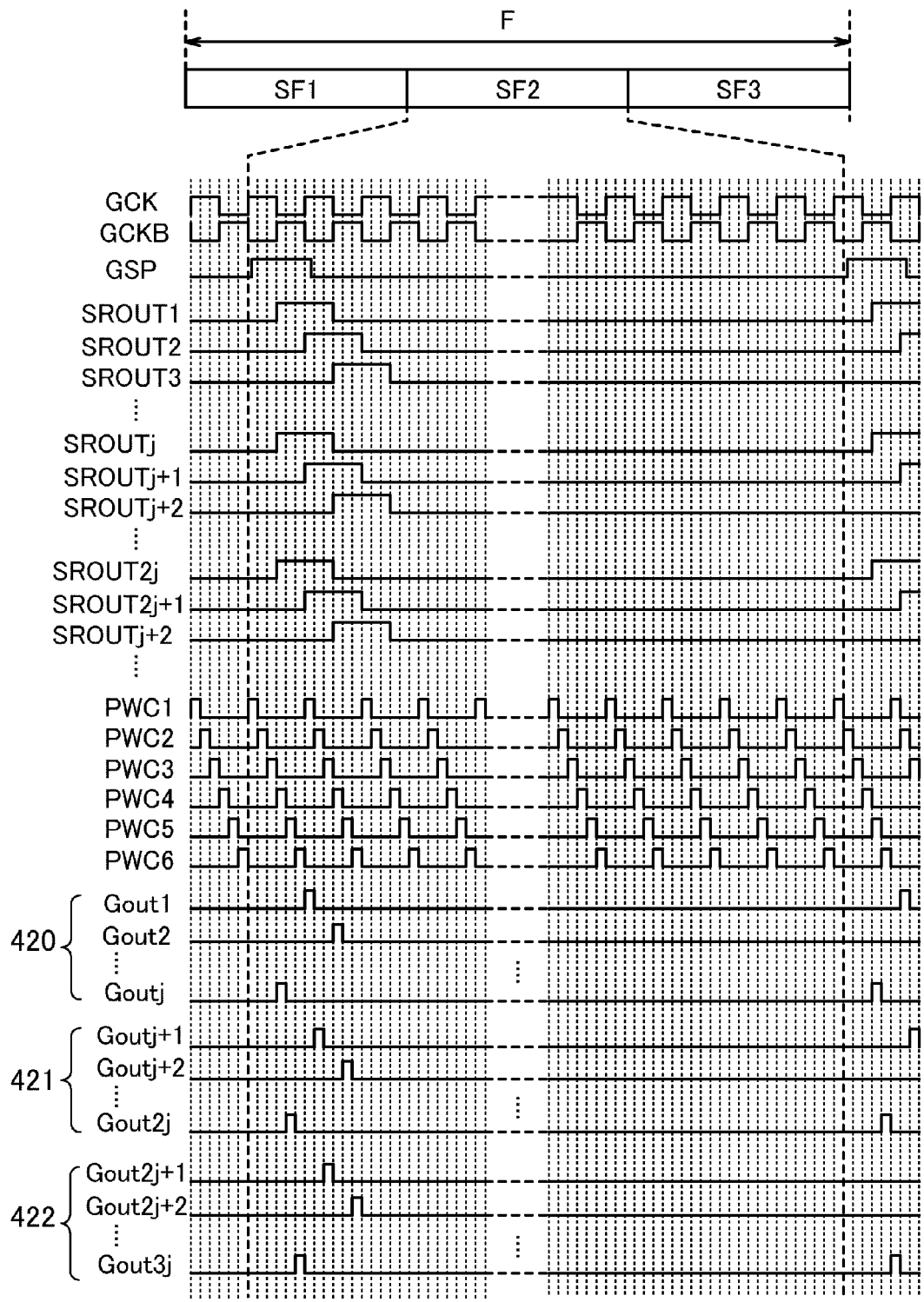
FIG. 11 is a timing diagram showing the operation of the scan line driver circuit.

Specifically, as shown in FIG. 11, the pulse width control signals PWC1 and PWC4 are input to the selector 461 in the first scan line driver circuit 410. The selector 461 in the first scan line driver circuit 410 includes a plurality of selectors SEL. A pulse width control signal PWC1 or PWC4 is input to each of the plurality of selectors SEL. This structure allows selection signals Gout1 to Goutj to be generated in the selector 461 in the first scan line driver circuit 410.

Similarly, the pulse width control signals PWC2 and PWC5 are input to the selector 461 in the second scan line driver circuit 410. The selector 461 in the second scan line driver circuit 410 includes a plurality of selectors SEL. A pulse width control signal PWC2 or PWC5 is input to each of the plurality of selectors SEL. This structure allows selection signals Goutj+1 to Gout2j to be generated in the selector 461 in the second scan line driver circuit 410.

Similarly, the pulse width control signals PWC3 and PWC6 are input to the selector 461 in the third scan line driver circuit 410. The selector 461 in the third scan line driver circuit 410 includes a plurality of selectors SEL. A pulse width control signal PWC3 or PWC6 is input to each of the plurality of selectors SEL. This structure allows selection signals2j+1 to Gout3j to be generated in the selector 461 in the third scan line driver circuit 410.

The selection signals Gout generated in the selector 461 are input to the level shifter 462 where their potential amplitudes are adjusted, and then input to the scan lines in the pixel area 408 through the digital buffer 463.

Specifically, the selection signals Gout1 to Goutj are input to the scan lines G1 to Gj in the first display region 420, respectively. The selection signals Goutj+1 to Gout2j are input to the scan lines Gj+1 to G2j in the second display region 421, respectively. The selection signals Gout2j+1 to Gout3j are input to the scan lines G2j+1 to G3j in the third display region 422, respectively.

The pixel included in the pixel area 408 is selected by the selection signal Gout input from the scan line driver circuit 410. The image signal IMG transmitted from the signal line driver circuit 409 to the pixel area 408 through the signal line is input to the above-described selected pixel.

This embodiment can be implemented in combination with any of the above embodiments as appropriate.

(Embodiment 3)

In this embodiment, the specific structure of the pixel 104 in FIG. 2 will be described.

Figure 12A:
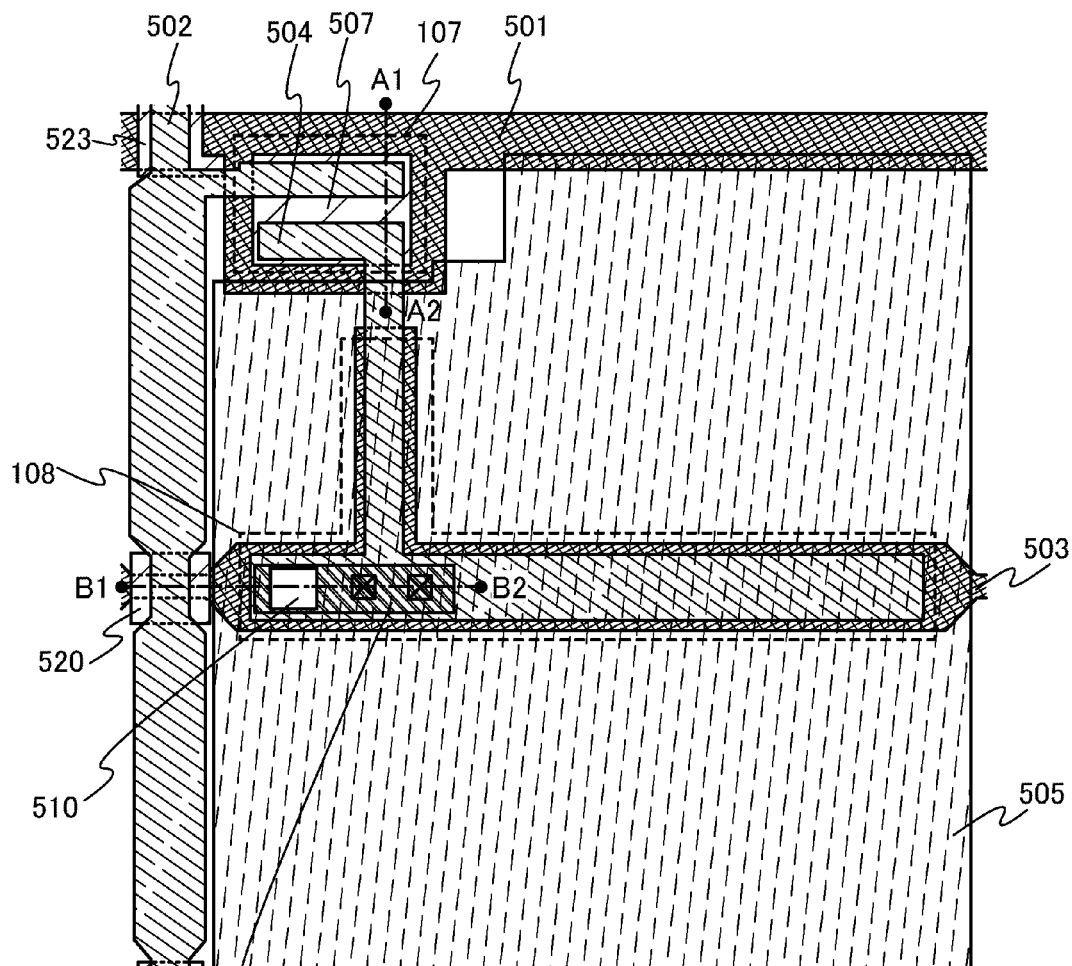
FIGS. 12A and 12B are a top view and cross-sectional view of a pixel.
Figure 12B:
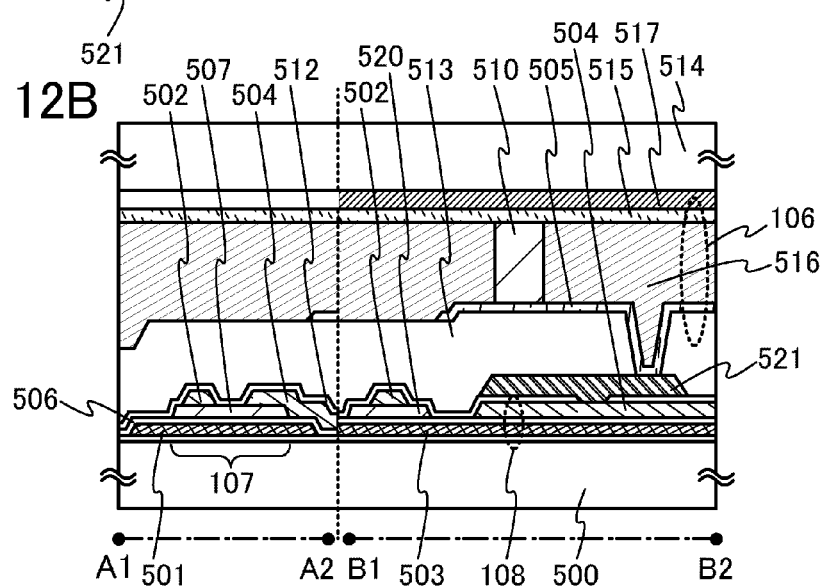

FIG. 12A is an example of the top view of the pixel. FIG. 12B is a cross-sectional view taken along broken lines A1-A2 and B1-B2 of FIG. 12A.

In the pixel shown in FIGS. 12A and 12B, a conductive film 501 serves as the scan line G or the gate electrode of the transistor 107. A conductive film 502 serves as the signal line S or the first terminal of the transistor 107. A conductive film 503 serves as one electrode of the capacitor 108. A conductive film 504 serves as the second terminal of the transistor 107 or the other electrode of the capacitor 108.

A gate insulating film 506 is formed over the conductive film 501 and the conductive film 503. An active layer 507 of the transistor 107 is formed over the gate insulating film 506 so as to overlap with the conductive film 501.

In the pixel shown in FIGS. 12A and 12B, the gate insulating film 506 and a semiconductor film 520 are provided in a portion where the conductive film 503 and the conductive film 502 overlap with each other. Specifically, the gate insulating film 506 is provided over the conductive film 503. The semiconductor film 520 is provided over the gate insulating film 506. The conductive film 502 is provided over the semiconductor film 520. By providing the semiconductor film 520 between the conductive film 502 and the conductive film 503, parasitic capacitance between the conductive film 502 and the conductive film 503 can be made low.

In the pixel shown in FIGS. 12A and 12B, the gate insulating film 506 and a semiconductor film 523 are provided in a portion where the conductive film 501 and the conductive film 502 overlap with each other. Specifically, the gate insulating film 506 is provided over the conductive film 501. The semiconductor film 523 is provided over the gate insulating film 506. The conductive film 502 is provided over the semiconductor film 523. By providing the semiconductor film 523 between the conductive film 502 and the conductive film 501, parasitic capacitance between the conductive film 502 and the conductive film 501 can be made low.

Note that the conductive films 501 and 503 can be formed by processing one conductive film formed over a substrate 500 having an insulating surface into a desired shape. The active layer 507, the semiconductor film 520, and the semiconductor film 523 can be formed by processing one semiconductor film formed over the gate insulating film 506 into a desired shape. The conductive films 502 and 504 can be formed by processing one conductive film formed over the gate insulating film 506, the active layer 507, the semiconductor film 520, and the semiconductor film 523 into a desired shape.

Moreover, in the pixel shown in FIGS. 12A and 12B, an insulating film 512 is formed to cover the active layer 507, the semiconductor film 520, the semiconductor film 523, the conductive film 502, and the conductive film 504. Further, a conductive film 521 is formed over the insulating film 512 to be in contact with the conductive film 504 through a contact hole formed in the insulating film 512. An insulating film 513 is formed over the conductive film 521 and the insulating film 512. A pixel electrode 505 is formed over the insulating film 513. The conductive film 521 and the pixel electrode 505 are in contact through a contact hole formed in the insulating film 513.

Note that although the conductive film 504 and the pixel electrode 505 are in contact with each other through the conductive film 521 in the pixel shown in FIGS. 12A and 12B, in one embodiment of the present invention, the conductive film 504 and the pixel electrode 505 may be in contact with each other without the conductive film 521.

A portion where the conductive film 503 overlaps with the conductive film 504 with the gate insulating film 506 interposed therebetween serves as the capacitor 108.

In this embodiment, a spacer 510 is formed over a portion where the conductive film 521 and the pixel electrode 505 overlap with each other and over the pixel electrode 505.

FIG. 12A is a top view of the pixel just after the step of forming the spacer 510. FIG. 12B shows the scene where a substrate 514 is provided to face the substrate 500 over which components up to the spacer 510 are formed.

A counter electrode 515 is formed over the substrate 514. A liquid crystal layer 516 including liquid crystal is provided between the pixel electrode 505 and the counter electrode 515. A liquid crystal element 106 is formed in a portion where the pixel electrode 505, the counter electrode 515, and the liquid crystal layer 516 overlap with one another.

In the case of a transmissive liquid crystal display device, the pixel electrode 505 and the counter electrode 515 can be, for example, of a light-transmitting conductive material such as indium tin oxide containing silicon oxide (ITSO), indium tin oxide (ITO), zinc oxide (ZnO), indium zinc oxide, or zinc oxide to which gallium is added (GZO). In the case of a reflective liquid crystal display device, the counter electrode 515 can be of a reflective or light-blocking material, e.g., titanium nitride, zirconium nitride, titanium, tungsten, nickel, platinum, chromium, silver, or aluminum.

Note that an alignment film may be provided as appropriate between the pixel electrode 505 and the liquid crystal layer 516 and/or between the counter electrode 515 and the liquid crystal layer 516. The alignment film can be formed using an organic resin such as polyimide or polyvinyl alcohol. Alignment treatment such as rubbing is performed on a surface of the alignment film in order to align liquid crystal molecules in a certain direction. Rubbing can be performed by rolling a roller wrapped with cloth of nylon or the like while being in contact with the alignment film such that the surface of the alignment film is rubbed in a certain direction. Note that it is also possible to form the alignment film having alignment characteristics with the use of an inorganic material such as silicon oxide by evaporation or the like, without alignment treatment.

Injection of liquid crystal for forming the liquid crystal layer 516 may be performed by a dispenser method (dripping method) or a dipping method (pumping method).

Note that the substrate 514 is provided with a light-blocking film 517 capable of blocking light, in order to prevent a disclination due to disordered orientation of the liquid crystal between pixels or in order to prevent dispersed light from entering a plurality of adjacent pixels. An organic resin containing black pigments such as carbon black or low-valent titanium oxide whose oxidation number is smaller than that of titanium dioxide can be used for the light-blocking film 517. Alternatively, a film of chromium can be used for the light-blocking film.

Although FIGS. 12A and 12B illustrates the liquid crystal element 106 in which the liquid crystal layer 516 is provided between the pixel electrode 505 and the counter electrode 515 as an example, the structure of a liquid crystal display device according to one embodiment of the present invention is not limited to this structure. A pair of electrodes may be formed over one substrate as in an IPS liquid crystal element or a liquid crystal element using a liquid crystal exhibiting a blue phase.

Next, the specific structure of the pixel 104 shown in FIG. 2, in which liquid crystal exhibiting a blue phase is used for the liquid crystal layer in the liquid crystal element will be described.

Figure 13A:
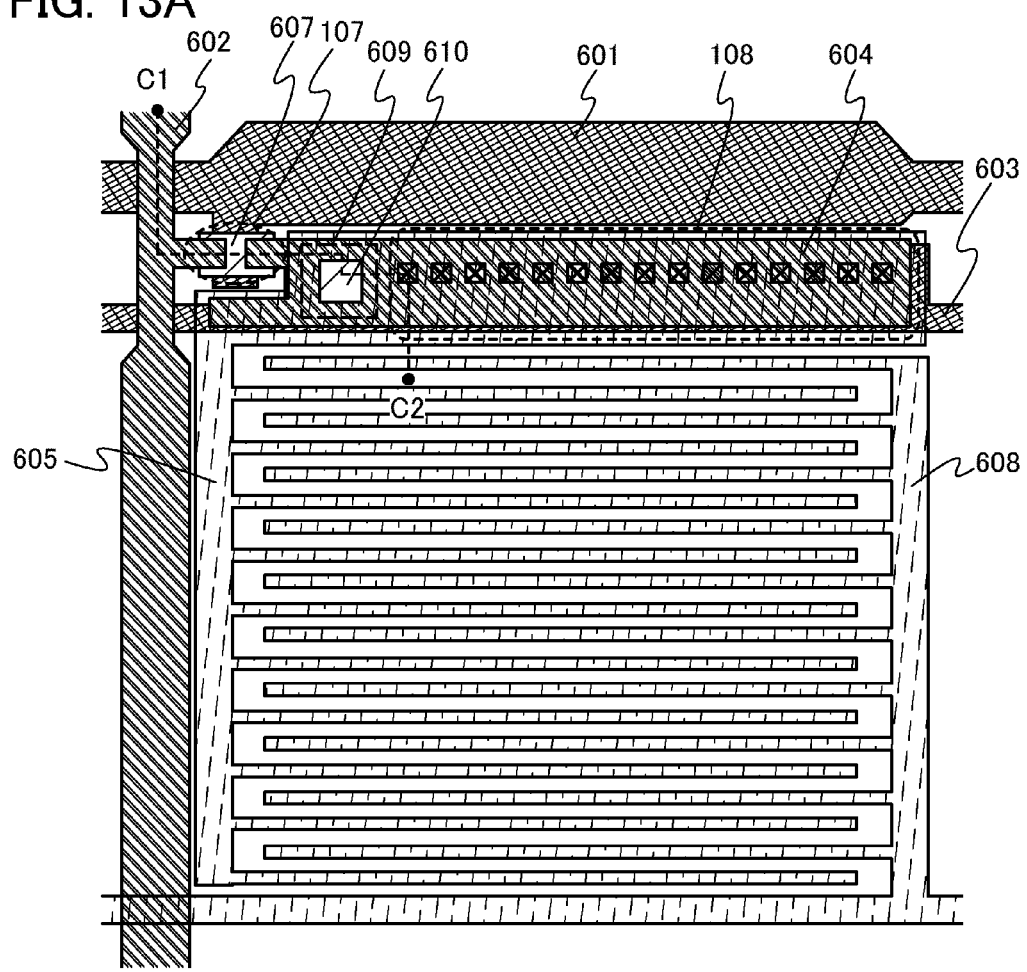
FIGS. 13A and 13B are a top view and cross-sectional view of a pixel.
Figure 13B:
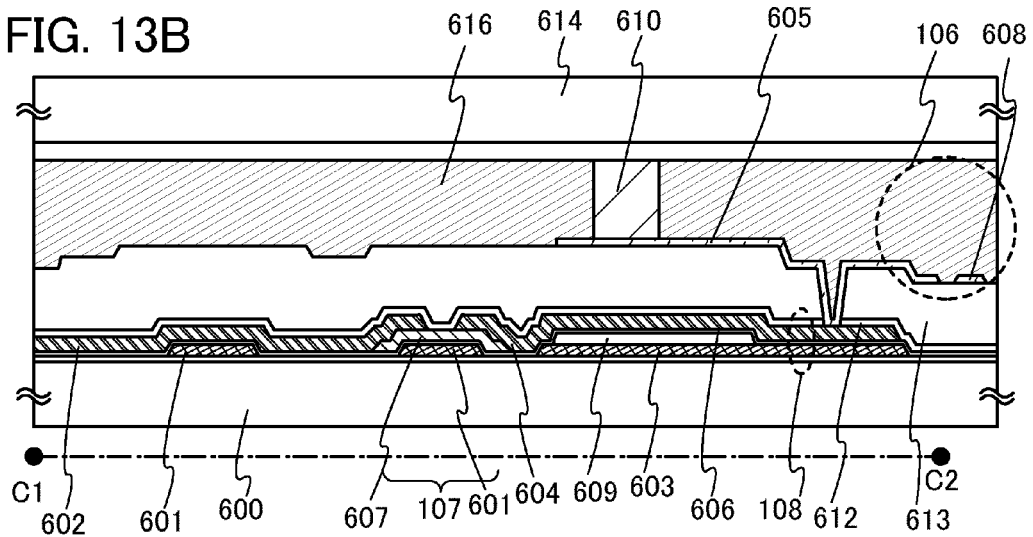

FIG. 13A shows an example of the top view of the pixel. FIG. 13B shows a cross-sectional view along dashed line C1-C2 in FIG. 13A.

In the pixel shown in FIGS. 13A and 13B, a conductive film 601 serves as the scan line G or the gate electrode of the transistor 107. A conductive film 602 serves as the signal line S or the first terminal of the transistor 107. A conductive film 603 serves as one electrode of the capacitor 108. A conductive film 604 serves as the second terminal of the transistor 107 or the other electrode of the capacitor 108.

A gate insulating film 606 is formed over the conductive film 601 and the conductive film 603. An active layer 607 of the transistor 107 is formed over the gate insulating film 606 so as to overlap with the conductive film 601. Further, an insulating film 612 and an insulating film 613 are sequentially formed so as to cover the active layer 607, the conductive film 602, and the conductive film 604. In addition, a pixel electrode 605 and a common electrode 608 are formed over the insulating film 613, and the conductive film 604 is connected to the pixel electrode 605 through a contact hole formed in the insulating film 612 and the insulating film 613.

The conductive films 601 and 603 can be formed by processing one conductive film formed over a substrate 600 having an insulating surface into a desired shape. The gate insulating film 606 is formed over the conductive films 601 and 603. The conductive films 602 and 604 can be formed by processing one conductive film formed over the active layer 607 and the gate insulating film 606 into a desired shape.

A portion where the conductive film 603 overlaps with the conductive film 604 with the gate insulating film 606 interposed therebetween serves as the capacitor 108.

In the pixel shown in FIGS. 13A and 13B, an insulating film 609 is formed between the conductive film 603 and the gate insulating film 606. Further, a spacer 610 is formed over a portion where the pixel electrode 605 and the insulating film 609 overlap with each other and over the pixel electrode 605.

FIG. 13A is a top view of the pixel just after the step of forming the spacer 610. FIG. 13B shows the scene where a substrate 614 is provided to face the substrate 600 over which components up to the spacer 610 are formed.

A liquid crystal layer 616 including liquid crystal is provided between the substrate 614, and the pixel electrode 605 and the common electrode 608. A liquid crystal element 106 is formed in a region including the pixel electrode 605, the common electrode 608, and the liquid crystal layer 616.

The pixel electrode 605 and the common electrode 608 can be, for example, of a light-transmitting conductive material such as indium tin oxide containing silicon oxide (ITSO), indium tin oxide (ITO), zinc oxide (ZnO), indium zinc oxide, or zinc oxide to which gallium is added (GZO).

Injection of liquid crystal for forming the liquid crystal layer 616 may be performed by a dispenser method (dripping method) or a dipping method (pumping method).

Note that the substrate 614 may be provided with a light-blocking film capable of blocking light, in order to prevent a disclination due to disordered orientation of the liquid crystal between pixels or in order to prevent dispersed light from entering a plurality of adjacent pixels. An organic resin containing black pigments such as carbon black or low-valent titanium oxide whose oxidation number is smaller than that of titanium dioxide can be used for the light-blocking film. Alternatively, a film of chromium can be used for the light-blocking film.

Note that in FIGS. 12A and 12B and FIGS. 13A and 13B, the active layer 507 or 607 in the transistor 107 may include a wide-gap semiconductor such as an oxide semiconductor or may include an amorphous, microcrystalline, polycrystalline, or single crystal semiconductor of silicon, germanium, or the like.

An oxide semiconductor has a wider band gap and lower intrinsic carrier density than silicon. Therefore, a transistor using an oxide semiconductor in its active layer can have an extremely low off-state current compared with a transistor using a normal semiconductor such as silicon or germanium in its active layer.

Note that a purified oxide semiconductor (purified OS) obtained by reduction of impurities such as moisture or hydrogen which serves as an electron donor (donor) and by reduction of oxygen defects is an intrinsic (i-type) semiconductor or a substantially i-type semiconductor. Therefore, a transistor including the oxide semiconductor has a characteristic of significantly small off-state current. Specifically, the concentration of hydrogen in the purified oxide semiconductor which is measured by secondary ion mass spectroscopy (SIMS) is less than or equal to $5 \times 10^{19}/cm^3$, preferably less than or equal to $5 \times 10^{18}/cm^3$, further preferably less than or equal to $5 \times 10^{17}/cm^3$, still further preferably less than or equal to $1 \times 10^{16}/cm^3$. The carrier density of an oxide semiconductor film, which can be measured by Hall effect measurement, is less than $1 \times 10^{14}/cm^3$, preferably less than $1 \times 10^{12}/cm^3$, further preferably less than $1 \times 10^{11}/cm^3$. The band gap of the oxide semiconductor is 2 eV or more, preferably 2.5 eV or more, or further preferably 3 eV or more. With the use of an oxide semiconductor film which is highly purified by a sufficient decrease in the concentration of impurities such as moisture or hydrogen and reduction of oxygen deficiency, the off-state current of the transistor can be decreased.

The analysis of the concentration of hydrogen in an oxide semiconductor film will be now described. The concentration of hydrogen in the semiconductor film is measured by SIMS. Because of the principle of SIMS, it is known that accurate data in the proximity of a surface of a sample or in the proximity of an interface between stacked films of different materials is difficult to obtain. Thus, in the case where the distribution of the hydrogen concentration in the thickness direction of a film is analyzed by SIMS, the average value of the hydrogen concentration in a region of the film where substantially the same value can be obtained without significant variation is employed as the hydrogen concentration. Further, in the case where the thickness of the film to be measured is small, a region where substantially the same value can be obtained cannot be found in some cases due to the influence of the hydrogen concentration of an adjacent film. In this case, the maximum value or the minimum value of the hydrogen concentration in a region where the film is provided is employed as the hydrogen concentration in the film. Furthermore, in the case where a mountain-shaped peak having the maximum value and a valley-shaped peak having the minimum value do not exist in the region where the film is provided, the value of the inflection point is employed as the hydrogen concentration.

Various experiments can actually prove small off-state current of the transistor that has a purified oxide semiconductor film serving as an active layer. For example, a transistor that has a purified oxide semiconductor film serving as an active layer and has a channel width of $1\times10^6$ μm and a channel length of 10 μm has a off-state current that is less than or equal to the measurement limit of a semiconductor parameter analyzer, i.e., less than or equal to $1\times10^{-13}$ A even when the voltage between the source terminal and the drain terminal is between 1 to 10 V. In this case, the off-state current density corresponding to a value obtained by dividing the off-state current by the channel width of the transistor is found to be less than or equal to 100 zA/μm.

Note that the oxide semiconductor contains preferably at least indium (In) or zinc (Zn), more preferably both In and Zn. The oxide semiconductor preferably contains, in addition to In and Zn, gallium (Ga) serving as a stabilizer that reduces variations in electrical characteristics among transistors using the above-described oxide. Alternatively, the oxide semiconductor preferably contains tin (Sn) serving as a stabilizer. Alternatively, the oxide semiconductor preferably contains hafnium (Hf) serving as a stabilizer. Alternatively, the oxide semiconductor preferably contains aluminum (Al) serving as a stabilizer.

Alternatively, the oxide semiconductor may contain one or more of the following lanthanoid elements serving as stabilizers: lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

The oxide semiconductor is, for example, an indium oxide, a tin oxide, a zinc oxide, a binary metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide, a ternary metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, a quaternary metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide. The oxide semiconductor may contain silicon.

Note that an In—Ga—Zn-based oxide, for example, means an oxide containing In, Ga, and Zn, and there is no limitation on the ratio of In, Ga, and Zn. The In—Ga—Zn-based oxide may contain a metal element other than In, Ga, and Zn. Note that an In—Ga—Zn-based oxide has sufficiently high resistance when there is no electric field and thus has a sufficiently low off-state current. In addition, also having high field-effect mobility, the In—Ga—Zn-based oxide is suitable for a semiconductor material used in a semiconductor device.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or any oxide having a composition close to this can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or any oxide having a composition close to this may be used.

However, the oxide semiconductor is not limited to those described above, and a material which has an appropriate composition may be used depending on required semiconductor characteristics (e.g., mobility, threshold voltage, and variation). In addition, in order to obtain the required semiconductor characteristics, it is preferable to optimize the carrier density, the impurity concentration, the defect density, the atomic ratio of a metal element to oxygen, the interatomic distance, the density, etc.

For example, it is relatively easy to obtain high mobility with an In—Sn—Z-based oxide. However, it is possible to obtain high mobility even with an In—Ga—Zn-based oxide by reducing the defect density in a bulk.

Note that for example, the expression "the composition of an oxide with an atomic ratio of In:Ga:Zn=a:b:c (a+b+c=1) is close to the composition of an oxide with an atomic ratio of In:Ga:Zn=A:B:C (A+B+C=1)" means that a, b, and c satisfy the equation $(a-A)^2+(b-B)^2+(c-C)^2 \le r^2$. A variable r may be 0.05, for example. The same applies to other oxides.

Unless otherwise specified, in the case of an n-channel transistor, the off-state current in this specification is a current which flows between a source terminal and a drain terminal when, in the state where the potential of the drain terminal is greater than that of the source terminal and that of a gate electrode, the potential of the gate terminal is less than or equal to zero with respect to the potential of the source terminal. Alternatively, in this specification, in the case of a p-channel transistor, the off-state current is a current which flows between a source terminal and a drain terminal when, in the state where the potential of the drain terminal is less than that of the source terminal and that of a gate electrode, the potential of the gate electrode is greater than or equal to zero with respect to the potential of the source terminal.

As an example of a semiconductor material whose band gap is wider than that of silicon and whose intrinsic carrier density is lower than that of silicon, a compound semiconductor such as silicon carbide (SiC) or gallium nitride (GaN) as well as an oxide semiconductor can be used. An oxide semiconductor has an advantage of high mass productivity because it can be formed by sputtering, a wet process, or the like unlike a compound semiconductor such as silicon carbide or gallium nitride. Unlike silicon carbide or gallium nitride, the oxide semiconductor can be deposited even at room temperature and thus can be deposited over a glass substrate or over an integrated circuit using silicon. An oxide semiconductor is applicable to a large-sized substrate of the sixth or later generation, unlike silicon with crystallinity such as polycrystalline silicon or microcrystalline silicon, silicon carbide, gallium nitride, and the like. Accordingly, an oxide semiconductor particularly has an advantage of high mass productivity. Further, in the case where an oxide semiconductor with crystallinity is used in order to improve the property (e.g., field-effect mobility) of a transistor, the oxide semiconductor with crystallinity can be easily obtained by heat treatment at 250° C. to 800° C.

In the liquid crystal display device, by inversion driving in which the polarity of the potential of an image signal is inverted with respect to the potential of the common electrode, deterioration of liquid crystal called burn-in can be prevented. However, in the inversion driving, the change in the potential supplied to the signal line is increased at the time of changing the polarity of the image signal; thus, a potential difference between a source terminal and a drain terminal of the transistor 107 which functions as a switching element is increased. In particular, in the case where the liquid crystal layer includes liquid crystal exhibiting a blue phase, the potential difference is significantly large. For example, in the case where the liquid crystal layer includes TN liquid crystal, the potential difference is about 10 V; in the case where the liquid crystal layer includes liquid crystal exhibiting a blue phase, the potential difference is as large as several tens of volts or more. Accordingly, in the transistor 107, a deterioration of characteristics such as a shift of threshold voltage is easily caused. Furthermore, in order to maintain the voltage held in the liquid crystal element, the off-state current needs to be low even when the potential difference between the source terminal and the drain terminal is large. A semiconductor whose band gap is larger than that of silicon or germanium and whose intrinsic carrier density is lower than that of silicon or germanium, such as an oxide semiconductor, is used for the transistor 107; therefore, the resistance of the transistor 107 to a high voltage can be increased and the off-state current can be made considerably low. Therefore, as compared to the case of using a transistor including a normal semiconductor material such as silicon or germanium, deterioration of the transistor 107 can be prevented and the voltage held in the liquid crystal element can be maintained.

Note that the transistor 107 includes at least a gate electrode on one side of the active layer 507 or 607. Alternatively, the transistor 107 may include a pair of gate electrodes with the active layer 507 or 607 interposed therebetween. In addition, the transistor 107 may be either a single-gate transistor which includes a single gate electrode and a single channel formation region, or a multi-gate transistor which includes a plurality of gate electrodes electrically connected to each other and thus includes a plurality of channel formation regions.

Examples of the material for the conductive films 501, 502, 503, 504, 521, 601, 602, 603, and 604 include an element selected from aluminum, chromium, copper, tantalum, titanium, molybdenum, or tungsten; an alloy containing any of these elements; and an alloy containing any of the above elements in combination. Alternatively, the conductive films 501, 502, 503, 504, 521, 601, 602, 603, and 604 may be a stack which is a metal film of aluminum or copper under or over which a film of a refractory metal such as chromium, tantalum, titanium, molybdenum, or tungsten is formed. Aluminum or copper is preferably used in combination with a refractory metal material in order to prevent a heat resistance problem and a corrosive problem. Examples of the refractory metal material include molybdenum, titanium, chromium, tantalum, tungsten, neodymium, scandium, and yttrium. A Cu—Mg—Al alloy, a Mo—Ti alloy, Ti, and Mo have high adhesion with an oxide film. For this reason, the use of a conductive film which is a stack of a conductive film of a Cu—Mg—Al alloy, a Mo—Ti alloy, Ti, or Mo overlaid by a conductive film of Cu for each of the conductive films 501, 502, 503, 504, 521, 601, 602, 603, and 604 can increase adhesion between an insulating film which is an oxide film and each of the conductive films 501, 502, 503, 504, 521, 601, 602, 603, and 604.

In the case where an oxide semiconductor film is used for the active layer 507 or 607, the oxide semiconductor film is formed in such a manner that the substrate is held in a treatment chamber kept at reduced pressure, a sputtering gas from which hydrogen and moisture are removed is introduced into the treatment chamber while residual moisture therein is removed, and a target is used. The substrate temperature in film formation may be 100° C. to 600° C., preferably 200° C. to 400° C. By forming the oxide semiconductor film while heating the substrate, the concentration of impurities contained in the formed oxide semiconductor film can be reduced. In addition, damage by sputtering can be reduced. In order to remove residual moisture in the treatment chamber, an entrapment vacuum pump is preferably used. For example, a cryopump, an ion pump, or a titanium sublimation pump is preferably used. The evacuation unit may be a turbo pump provided with a cold trap. In the film formation chamber which is evacuated with the cryopump, for example, a hydrogen atom, a compound containing a hydrogen atom, such as water ($H_2O$), (preferably, also a compound containing a carbon atom), and the like are removed, whereby the concentration of impurities contained in the oxide semiconductor film formed in the film formation chamber can be reduced.

Moreover, when the leakage rate of the treatment chamber of the sputtering apparatus is set to $1 \times 10^{-10}$ Pa·m$^3$/second or lower, the entry of impurities such as alkali metal or hydride into the oxide semiconductor film that is being formed by sputtering can be reduced. Further, with the use of the above entrapment vacuum pump as an evacuation system, counter flow of impurities such as alkali metal, a hydrogen atom, a hydrogen molecule, water, a hydroxyl group, or hydride from the evacuation system can be reduced.

When the purity of the target is set to 99.99% or higher, alkali metal, a hydrogen atom, a hydrogen molecule, water, a hydroxyl group, hydride, or the like entering the oxide semiconductor film can be reduced. The use of this target reduces the concentration of alkali metal such as lithium, sodium, or potassium in the oxide semiconductor film.

Note that, in some cases, the oxide semiconductor film formed by sputtering or the like contains a large amount of moisture or hydrogen (including a hydroxyl group) acting as an impurity. Moisture and hydrogen easily form a donor level and thus serve as impurities in the oxide semiconductor. In order to reduce an impurity such as moisture or hydrogen in the oxide semiconductor film (dehydration or dehydrogenation), the oxide semiconductor film is preferably subjected to heat treatment in a reduced-pressure atmosphere, an inert gas atmosphere of nitrogen, a rare gas, or the like, an oxygen gas atmosphere, or an ultra dry air atmosphere (the moisture amount is 20 ppm (−55° C. by conversion into a dew point) or less, preferably 1 ppm or less, further preferably 10 ppb or less, in the case where the measurement is performed by a dew point meter in a cavity ring down laser spectroscopy (CRDS) method).

By performing heat treatment on the oxide semiconductor film, moisture or hydrogen in the oxide semiconductor film can be eliminated. Specifically, heat treatment may be performed at temperatures in the range of 250° C. to 750° C., preferably at temperatures higher than or equal to 400° C. and lower than the strain point of the substrate. For example, heat treatment may be performed at 500° C. for approximately 3 to 6 minutes. When an RTA method is used for the heat treatment, dehydration or dehydrogenation can be performed in a short time; therefore, treatment can be performed even at temperatures higher than the strain point of a glass substrate.

Note that the heat treatment apparatus is not limited to an electrical furnace, and may include a device for heating an object to be processed by heat conduction or heat radiation from a heating element such as a resistance heating element. For example, an RTA (rapid thermal anneal) apparatus such as a GRTA (gas rapid thermal anneal) apparatus or an LRTA (lamp rapid thermal anneal) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus for heat treatment using a high-temperature gas. As the gas, an inert gas which does not react with an object to be processed by heat treatment, such as nitrogen or a rare gas like argon, is used.

In the heat treatment, it is preferable that moisture, hydrogen, or the like be not contained in nitrogen or a rare gas such as helium, neon, or argon. It is preferable that the purity of nitrogen or a rare gas such as helium, neon, or argon which is introduced into the heat treatment apparatus be set to be 6N (99.9999%) or higher, preferably 7N (99.99999%) or higher (that is, the impurity concentration is 1 ppm or less, preferably 0.1 ppm or less).

It has been pointed out that an oxide semiconductor is insensitive to impurities, there is no problem even when a considerable amount of metal impurities is contained in the film, and therefore, soda-lime glass which contains a large amount of alkali metal such as sodium and is inexpensive can also be used (Kamiya, Nomura, and Hosono, "Carrier Transport Properties and Electronic Structures of Amorphous Oxide Semiconductors: The present status", KOTAI BUTSURI (SOLID STATE PHYSICS), 2009, Vol. 44, pp. 621-633). However, this is not a proper consideration. Alkali metal is not an element included in an oxide semiconductor, and therefore, is an impurity. Also, alkaline-earth metal is an impurity in the case where alkaline-earth metal is not an element included in an oxide semiconductor. Alkali metal, in particular, Na becomes Na$^+$ when an insulating film in contact with the oxide semiconductor film is an oxide and Na diffuses into the insulating film. Further, in the oxide semiconductor film, Na cuts or enters a bond between metal and oxygen which are included in the oxide semiconductor. As a result, for example, deterioration of characteristics of the transistor, such as a normally-on state of the transistor due to shift of a threshold voltage in the negative direction, or reduction in mobility, occurs. In addition, variation in characteristics also occurs. Such deterioration of characteristics of the transistor and variation in characteristics due to the impurity remarkably appear when the hydrogen concentration in the oxide semiconductor film is very low. Therefore, when the hydrogen concentration in the oxide semiconductor film is less than or equal to $1\times10^{18}/cm^3$, preferably less than or equal to $1\times10^{17}/cm^3$, the concentration of the above impurity is preferably reduced. Specifically, the Na concentration measured by secondary ion mass spectrometry is preferably less than or equal to $5\times10^{16}/cm^3$, more preferably less than or equal to $1\times10^{16}/cm^3$, still more preferably less than or equal to $1\times10^{15}/cm^3$. In a similar manner, the measurement value of Li concentration is preferably less than or equal to $5\times10^{15}/cm^3$, more preferably less than or equal to $1\times10^{15}/cm^3$. In a similar manner, the measurement value of K concentration is preferably less than or equal to $5\times10^{15}/cm^3$, more preferably less than or equal to $1\times10^{15}/cm^3$.

Reducing the hydrogen concentration in the oxide semiconductor film to highly purify the oxide semiconductor film leads to stabilization of the oxide semiconductor film. In addition, heat treatment at a temperature lower than or equal to the glass transition temperature makes it possible to form an oxide semiconductor film with a wide band gap in which the carrier density is extremely low. Therefore, the transistor can be manufactured using a large-sized substrate, so that the productivity can be increased. In addition, by using the oxide semiconductor film in which the hydrogen concentration is reduced and the purity is improved, a transistor having a high withstand voltage and an extremely small off-state current can be manufactured. The above heat treatment can be performed at any time after the oxide semiconductor film is formed.

Note that the oxide semiconductor film may be either amorphous or crystalline. The use of an oxide including crystals with c-axis alignment (also referred to as CAAC: c axis aligned crystal) for a crystalline oxide semiconductor film is preferable in that it offers the advantage of increasing the reliability of the transistor.

An oxide semiconductor film with CAAC can also be made by Sputtering. In order to obtain CAAC by sputtering, it is important to form hexagonal crystals in an initial stage of deposition of an oxide semiconductor film and cause crystal growth from the hexagonal crystals as seeds. In order to achieve this, it is preferable that the distance between the target and the substrate be long (e.g., 150 mm to 200 mm) and the substrate heating temperature be 100° C. to 500° C., more preferably 200° C. to 400° C., still more preferably 250° C. to 300° C. In addition to this, the deposited oxide semiconductor film is subjected to heat treatment at a temperature higher than the substrate heating temperature in the deposition step, so that micro-defects in the film and defects at the interface between layers can be compensated.

Specifically, CAAC has a hexagonal crystal structure including zinc, in which bonds for forming hexagonal lattices are formed in the a-b plane which is parallel to a surface of the insulating film and c-axes are substantially perpendicular to the a-b plane.

In CAAC, metal atoms and oxygen atoms are bonded in an orderly manner in comparison with an amorphous oxide semiconductor. In other words, in the case where an oxide semiconductor is amorphous, the coordination number may vary according to the kind of metal atom. In contrast, in the case of CAAC, the coordination numbers of metal atoms are substantially the same. Therefore, CAAC has the advantages of reducing microscopic oxygen defects and decreasing instability and charge transfer due to desorption of a hydrogen atom (including a hydrogen ion) or an alkali metal atom.

Making a transistor with an oxide semiconductor film with CAAC reduces the difference between the transistor threshold voltages before and after light irradiation and a bias-temperature stress (BT) test for the transistor. Thus, a transistor having stable electrical characteristics can be made.

In the case where an oxide semiconductor film is used as the active layer 507 or 607, insulating films in contact with the oxide semiconductor film, such as the gate insulating film 506, the insulating film 512, the gate insulating film 606, and the insulating film 612 can be formed using a single layer or a stacked layer using silicon oxide, silicon nitride oxide, silicon oxynitride, silicon nitride, hafnium oxide, aluminum oxide, tantalum oxide, yttrium oxide, hafnium silicate (Hf-Si$_x$O$_y$, (x>0, y>0)), hafnium silicate (HfSi$_x$O$_y$, (x>0, y>0)) to which nitrogen is added, hafnium aluminate (HfAl$_x$O$_y$, (x>0, y>0)) to which nitrogen is added, or the like by plasma CVD, sputtering, or the An inorganic material containing oxygen is used for the above insulating films, whereby a structure can be provided in which oxygen is supplied from the above insulating films to the oxide semiconductor film and oxygen defects acting as donors are reduced to satisfy the stoichiometric composition even when the oxygen defects are generated in the oxide semiconductor film by heat treatment performed to reduce moisture or hydrogen. Thus, the channel formation region can be close to i-type and variations in electrical characteristics among the transistors 107 due to oxygen defects can be reduced, so that the electrical characteristics can be improved.

The insulating films in contact with the oxide semiconductor film, such as the gate insulating film 506, the insulating film 512, the gate insulating film 606, and the insulating film 612 may be formed using an insulating material containing a Group 13 element and oxygen. Many of oxide semiconductor materials contain a Group 13 element, and an insulating material containing a Group 13 element works well with oxide semiconductors. By using an insulating material containing a Group 13 element for an insulating film in contact with the oxide semiconductor, an interface with the oxide semiconductor can keep a favorable state.

An insulating material containing a Group 13 element is an insulating material containing one or more Group 13 elements. Examples of the insulating material containing a Group 13 element include gallium oxide, aluminum oxide, aluminum gallium oxide, and gallium aluminum oxide. Here, aluminum gallium oxide is a material in which the amount of aluminum is larger than that of gallium in atomic percent, and gallium aluminum oxide is a material in which the amount of gallium is larger than or equal to that of aluminum in atomic percent.

For example, in the case where an insulating film is formed to be in contact with an oxide semiconductor film containing gallium, the use of a material containing gallium oxide for an insulating film can produce the favorable characteristics of an interface between the oxide semiconductor film and the insulating film. For example, forming the oxide semiconductor film and the insulating film containing gallium oxide so that they are in contact with each other can reduce pile-up of hydrogen at the interface between the oxide semiconductor film and the insulating film. Note that the use of an element belonging to the same group as a constituent element of the oxide semiconductor for an insulating film offers a similar advantage. For example, it is effective to form an insulating film with a material containing aluminum oxide. Note that aluminum oxide is substantially impervious to water. Therefore, the use of this material is preferable in that it prevents the entry of water into the oxide semiconductor film.

This embodiment can be implemented in appropriate combination with any of the other embodiments.

(Embodiment 4)

Figure 14:
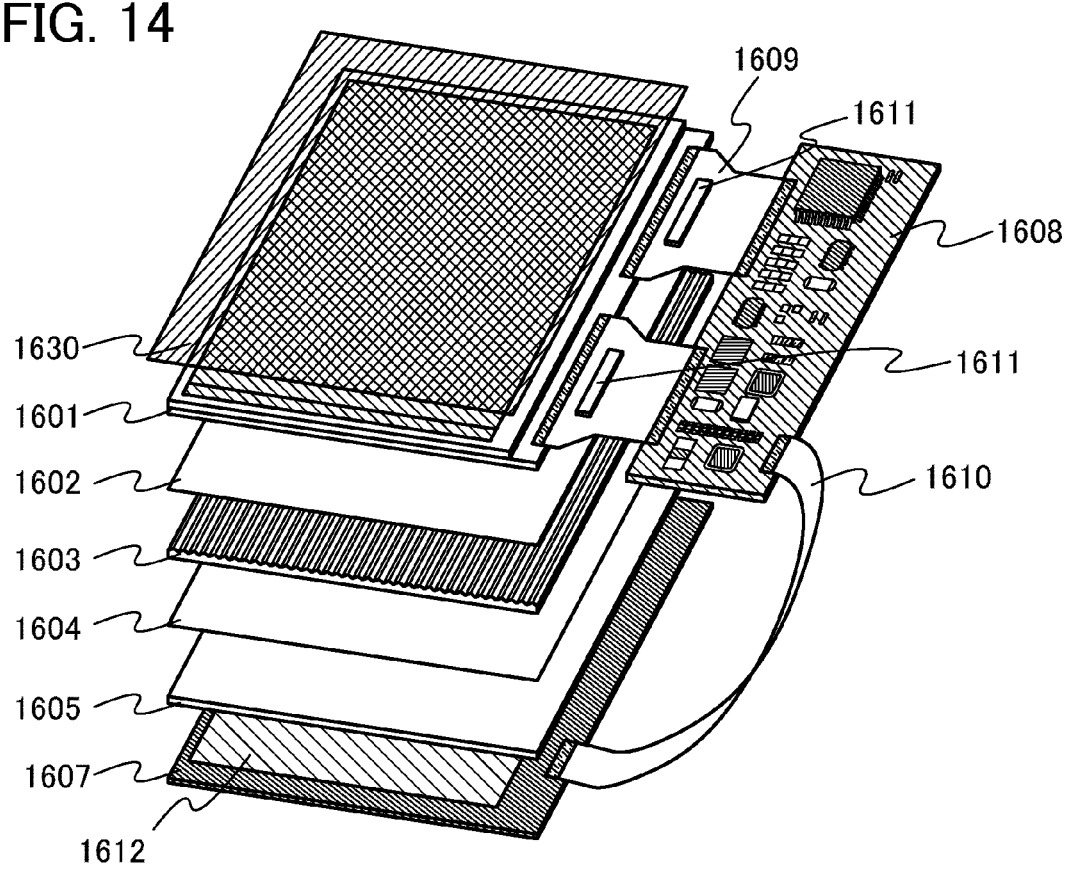
FIG. 14 is a perspective view showing the structure of a liquid crystal display device.

FIG. 14 is an example of a perspective view showing the structure of a liquid crystal display device. The liquid crystal display device in FIG. 14 includes an optical system 1630, a liquid crystal panel 1601 including a pixel area, a first diffuser plate 1602, a prism sheet 1603, a second diffuser plate 1604, a light guide plate 1605, a backlight panel 1607, a circuit board 1608, and a substrate 1611 provided with a signal line driver circuit.

The optical system 1630, the liquid crystal panel 1601, the first diffuser plate 1602, the prism sheet 1603, the second diffuser plate 1604, the light guide plate 1605, and the backlight panel 1607 are sequentially stacked. The backlight panel 1607 has a backlight 1612 including a plurality of light sources. Light from the backlight 1612 that is diffused in the light guide plate 1605 is delivered to the liquid crystal panel 1601 through the first diffuser plate 1602, the prism sheet 1603, and the second diffuser plate 1604.

Although the first diffuser plate 1602 and the second diffuser plate 1604 are used in this embodiment, the number of diffuser plates is not limited to two. The number of diffuser plates may be one, or may be three or more. The diffuser plate may be provided between the light guide plate 1605 and the liquid crystal panel 1601. Therefore, the diffuser plate may be provided only on the side closer to the liquid crystal panel 1601 than the prism sheet 1603, or may be provided only on the side closer to the light guide plate 1605 than the prism sheet 1603.

The shape of the prism sheet 1603 is not limited to a sawtooth shape in section illustrated in FIG. 14, and may be a shape with which light from the light guide plate 1605 can be concentrated on the liquid crystal panel 1601 side.

The circuit board 1608 is provided with a circuit which generates various signals input to the liquid crystal panel 1601, a circuit which processes the signals, or the like. In FIG. 14, the circuit board 1608 and the liquid crystal panel 1601 are connected to each other with a COF tape 1609. Moreover, the substrate 1611 provided with the signal line driver circuit is connected to the COF tape 1609 by a chip on film (COF) method.

FIG. 14 illustrates the case where the circuit board 1608 is provided with a control circuit which controls driving of the backlight 1612 and the control circuit and the backlight panel 1607 are connected to each other with an FPC 1610. Note that the control circuit may be formed over the liquid crystal panel 1601. In that case, the liquid crystal panel 1601 and the backlight panel 1607 are connected to each other with an FPC or the like.

Note that FIG. 14 illustrates the case where the direct-below type backlight 1612 provided directly below the liquid crystal panel 1601 is used as a light supply portion; however, the present invention is not limited to this structure. In one embodiment of the present invention, an edge-light type backlight provided at an end portion of the liquid crystal panel 1601 may be used as a light supply portion. Alternatively, in one embodiment of the present invention, a frontlight may be used as a light supply portion.

Figure 15:
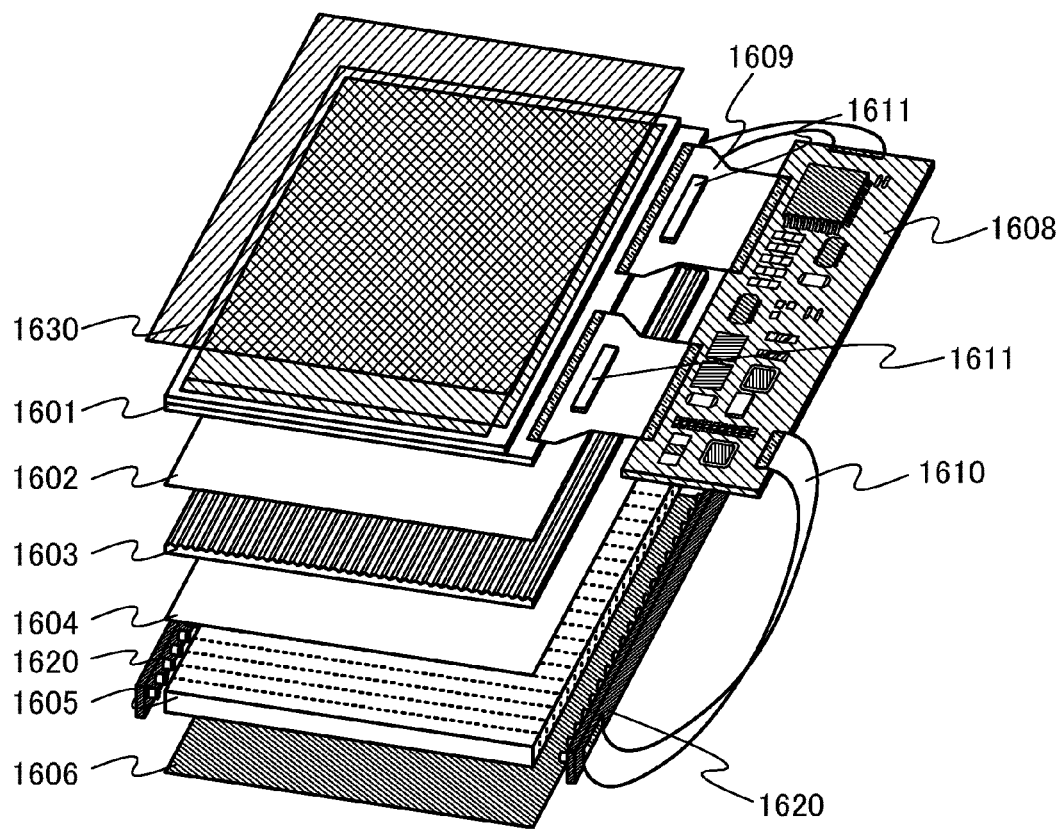
FIG. 15 is a perspective view showing the structure of a liquid crystal display device.

FIG. 15 is a perspective view showing the structure of a liquid crystal display device in which an edge-light type backlight 1620 is used. In FIG. 15, the backlight 1620 is provided at an end portion of the light guide plate 1605. Light entering the light guide plate 1605 from the backlight 1620 is repeatedly reflected by a surface of the light guide plate 1605 to be transmitted to the liquid crystal panel 1601.

This embodiment can be implemented in appropriate combination with any of the other embodiments.

[Example 1]

The advantages of a liquid crystal display device according to one embodiment of the present invention are reduced color breakup, low power consumption, and a high-definition 3D image. Therefore, an electronic appliance using this liquid crystal display device has low power consumption and is capable of displaying a 3D image with high visibility. When using such a low-power-consumption liquid crystal display device, particularly a portable electronic appliance having difficulty receiving power constantly has the advantage of long continuous operating time.

A liquid crystal display device according to one embodiment of the present invention can be used in display devices, laptop computers, and image reproducing devices provided with recording media (a typical example of which is devices reproducing the content of recording media such as digital versatile discs (DVDs) and having a display for displaying the reproduced images). Examples of an electronic appliance in which a liquid crystal display device according to one embodiment of the present invention can be used include mobile phones, portable game consoles, personal digital assistants, e-book readers, video cameras, digital still cameras, goggle-type displays (head mounted displays), navigation systems, audio reproducing devices (e.g., car audio components and digital audio players), copiers, facsimiles, printers, multifunction printers, automated teller machines (ATM), and vending machines. Specific examples of these electronic appliances are illustrated in FIGS. 16A to 16C.

Figure 16A:
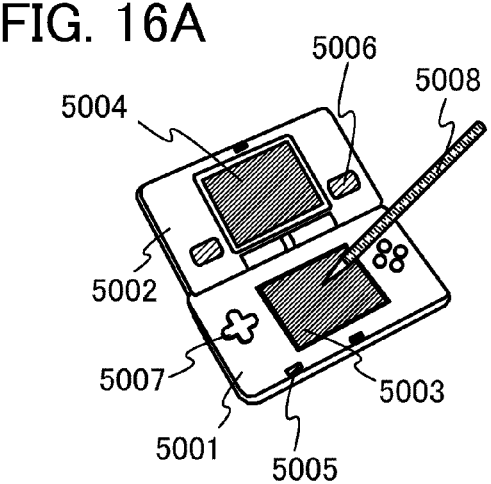
FIGS. 16A to 16C are diagrams of electronic appliances.

FIG. 16A illustrates a portable game console including a housing 5001, a housing 5002, a display portion 5003, a display portion 5004, a microphone 5005, speakers 5006, operation keys 5007, and a stylus 5008. A liquid crystal display device according to one embodiment of the present invention can be used as the display portion 5003 or 5004. The portable game console has low power consumption and is capable of displaying a 3D image with high visibility when a liquid crystal display device according to one embodiment of the present invention is used as the display portion 5003 or 5004. Further, the continuous operating time of the portable game console is long when a liquid crystal display device according to one embodiment of the present invention is used in the portable game console. Note that although the portable game console illustrated in FIG. 16A has the two display portions 5003 and 5004, the number of display portions included in a portable game console is not limited to this.

Figure 16B:
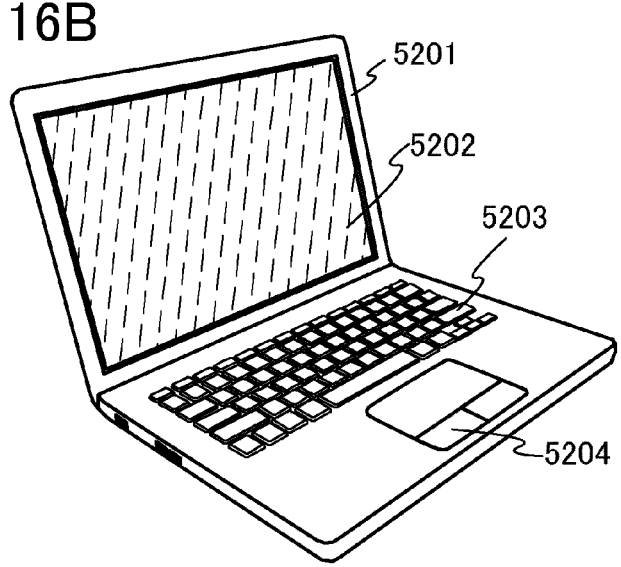

FIG. 16B illustrates a laptop personal computer including a housing 5201, a display portion 5202, a keyboard 5203, and a pointing device 5204. A liquid crystal display device according to one embodiment of the present invention can be used as the display portion 5202. The laptop personal computer has low power consumption and is capable of displaying a 3D image with high visibility when a liquid crystal display device according to one embodiment of the present invention is used as the display portion 5202. Further, the continuous operating time of the laptop personal computer is long when a liquid crystal display device according to one embodiment of the present invention is used in the laptop personal computer.

Figure 16C:
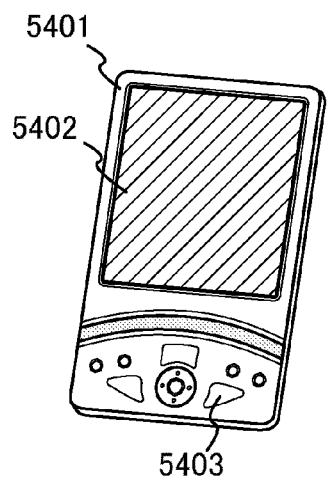

FIG. 16C illustrates a personal digital assistant including a housing 5401, a display portion 5402, and operation keys 5403. A liquid crystal display device according to one embodiment of the present invention can be used as the display portion 5402. The personal digital assistant has low power consumption and is capable of displaying a 3D image with high visibility when a liquid crystal display device according to one embodiment of the present invention is used as the display portion 5402. Further, the continuous operating time of the personal digital assistant is long when a liquid crystal display device according to one embodiment of the present invention is used in the personal digital assistant.

As described above, one embodiment of the present invention is capable of extremely wide application and is applicable to all types of electronic appliances.

This embodiment can be implemented in appropriate combination with any of the other embodiments.

This application is based on Japanese Patent Application serial no. 2010-281177 filed with Japan Patent Office on Dec. 17, 2010, the entire contents of which are hereby incorporated by reference.

What is claimed is:

1. A liquid crystal display device comprising:
a pixel area comprising a first display region and a second display region;
a light supply portion configured to supply a plurality of pieces of light having different hues to each of the first display region and the second display region; and
an optical system,
wherein two pieces of light supplied to each of the first and second display regions in parallel have different hues, the two pieces of light being part of the plurality of pieces of light,
wherein a plurality of pairs of pixels are arranged in each of the first display region and the second display region, each of the plurality of pairs of pixels being composed of a right-eye pixel and a left-eye pixel,
wherein the plurality of pieces of light is supplied to the first display region and the second display region to emit a first light with the right-eye pixel and a second light with the left-eye pixel, and
wherein the optical system makes a travel direction of the first light differ from a travel direction of the second light.

2. The liquid crystal display device according to claim 1, wherein a liquid crystal layer exhibiting a blue phase is included in the pixel area.

3. The liquid crystal display device according to claim 1, wherein the optical system is a parallax barrier, a lenticular lens, or a microlens array.

4. A liquid crystal display device comprising:
a pixel area comprising a first display region and a second display region;
a light supply portion configured to supply a plurality of pieces of light having different hues to each of the first display region and the second display region; and
an optical system,
wherein two pieces of light supplied to each of the first and second display regions in parallel have different hues, the two pieces of light being part of the plurality of pieces of light,
wherein a plurality of pairs of pixels are arranged in each of the first display region and the second display region, each of the plurality of pairs of pixels being composed of adjacent pixels,
wherein the plurality of pieces of light is supplied to the first display region and the second display region to emit a first light with one of the pair of pixels and a second light with the other one of the pair of pixels, and
wherein the optical system orients a travel direction of the first light to a right eye of a viewer and a travel direction of the second light to a left eye of the viewer.

5. The liquid crystal display device according to claim 4, wherein a liquid crystal layer exhibiting a blue phase is included in the pixel area.

6. The liquid crystal display device according to claim 4, wherein the optical system is a parallax barrier, a lenticular lens, or a microlens array.

7. A liquid crystal display device comprising:
a pixel area comprising a first display region and a second display region;
a light supply portion configured to supply a plurality of pieces of light having different hues to each of the first display region and the second display region; and
an optical system,
wherein two pieces of light supplied to each of the first and second display regions in parallel have different hues, the two pieces of light being part of the plurality of pieces of light,
wherein a plurality of pairs of pixels are arranged in each of the first display region and the second display region, each of the plurality of pairs of pixels being composed of a right-eye pixel and a left-eye pixel,
wherein the plurality of pieces of light is supplied to the first display region and the second display region to emit a first light with the right-eye pixel and a second light with the left-eye pixel,
wherein the optical system makes a travel direction of the first light differ from a travel direction of the second light,
wherein the pixel comprises a transistor and a liquid crystal element receiving an image signal through the transistor, and wherein the transistor has an oxide semiconductor in an active layer.

8. The liquid crystal display device according to claim 7, wherein a liquid crystal layer exhibiting a blue phase is included in the pixel area.

9. The liquid crystal display device according to claim 7, wherein the optical system is a parallax barrier, a lenticular lens, or a microlens array.

10. The liquid crystal display device according to claim 7, wherein the oxide semiconductor is an In-Ga-Zn-based oxide semiconductor.

11. The liquid crystal display device according to claim 7, wherein a hydrogen concentration in the oxide semiconductor is less than or equal to $5\times10^{19}/cm^3$.

12. A liquid crystal display device comprising:
a pixel area comprising a first display region and a second display region;
a light supply portion configured to supply a plurality of pieces of light having different hues to each of the first display region and the second display region; and
an optical system,
wherein two pieces of light supplied to each of the first and second display regions in parallel have different hues, the two pieces of light being part of the plurality of pieces of light,
wherein a plurality of pairs of pixels are arranged in each of the first display region and the second display region, each of the plurality of pairs of pixels being composed of adjacent pixels,
wherein the plurality of pieces of light is supplied to the first display region and the second display region to emit a first light with one of the pair of pixels and a second light with the other one of the pair of pixels,
wherein the optical system orients a travel direction of the first light to a right eye of a viewer and a travel direction of the second light to a left eye of the viewer,
wherein the pixel comprises a transistor and a liquid crystal element receiving an image signal through the transistor, and
wherein the transistor has an oxide semiconductor in an active layer.

13. The liquid crystal display device according to claim 12, wherein a liquid crystal layer exhibiting a blue phase is included in the pixel area.

14. The liquid crystal display device according to claim 12, wherein the optical system is a parallax barrier, a lenticular lens, or a microlens array.

15. The liquid crystal display device according to claim 12, wherein the oxide semiconductor is an In-Ga-Zn-based oxide semiconductor.

16. The liquid crystal display device according to claim 12, wherein a hydrogen concentration in the oxide semiconductor is less than or equal to $5\times10^{19}/cm^3$.

* * * * *